US012062382B2

(12) United States Patent
Heo et al.

(10) Patent No.: US 12,062,382 B2
(45) Date of Patent: Aug. 13, 2024

(54) ELECTRONIC DEVICE AND METHOD FOR CONTROLLING SPEECH INPUT/OUTPUT OF ELECTRONIC DEVICE

(71) Applicant: Samsung Electronics Co., Ltd., Suwon-si (KR)

(72) Inventors: Seungyoon Heo, Suwon-si (KR); Jungyeol An, Suwon-si (KR); Taewoo Kim, Suwon-si (KR); Sunghwa Woo, Suwon-si (KR); Gangyoul Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 229 days.

(21) Appl. No.: 17/579,875

(22) Filed: Jan. 20, 2022

(65) Prior Publication Data

US 2022/0208208 A1 Jun. 30, 2022

Related U.S. Application Data

(63) Continuation of application No. PCT/KR2021/020180, filed on Dec. 29, 2021.

(30) Foreign Application Priority Data

Dec. 31, 2020 (KR) .......................... 10-2020-0188907

(51) Int. Cl.
*G10L 21/0232* (2013.01)
*G10L 15/22* (2006.01)
(Continued)

(52) U.S. Cl.
CPC .......... *G10L 21/0232* (2013.01); *G10L 15/22* (2013.01); *G10L 15/28* (2013.01);
(Continued)

(58) Field of Classification Search
CPC ..... G10L 21/0232; G10L 15/22; G10L 15/28; G10L 25/06; G10L 25/84; G10L 2021/02082; H04R 3/00
See application file for complete search history.

(56) References Cited

U.S. PATENT DOCUMENTS 5,539,731 A * 7/1996 Haneda ................. H04M 9/082
379/406.11
6,535,604 B1 * 3/2003 Provencal ............... H04M 9/10
379/388.05

(Continued)

FOREIGN PATENT DOCUMENTS

JP 2007-243722 A 9/2007
JP 2013-225747 A 10/2013
(Continued)

OTHER PUBLICATIONS

International Search Report dated Apr. 8, 2022, issued in International Application No. PCT/KR2021/020180.
(Continued)

*Primary Examiner* — Mohammad K Islam
(74) *Attorney, Agent, or Firm* — Jefferson IP Law, LLP

(57) ABSTRACT

An electronic device is provided. The electronic device includes a communication module, a sensor module, a sound input module, a sound output module, a memory including a buffer, and a processor. The processor is configured to determine whether an external electronic device has at least one speaker and/or microphone, select, a speech reception device from among the electronic device and the external electronic device based on sensing information received when a call is connected, select a speech transmission device, from among the electronic device and the external electronic device based on a comparison of a speech signal received from the electronic device with a speech signal received from the external electronic device when a call is (Continued)

connected, and if the speech transmission device and the speech reception device are different devices, enable at least one microphone included in the speech transmission device, disable at least one speaker included in the speech transmission device, disable at least one microphone included in the speech reception device, and enable at least one speaker included in the speech reception device, acquire an echo reference signal related to reception speech received from the speech reception device and store the echo reference signal in the buffer, determine, based on comparison of the stored echo reference signal to transmission speech received from the speech transmission device, an EPD value relating to an echo signal included in the transmission speech, and cancel the echo signal by using the echo reference signal and the determined EPD value.

18 Claims, 10 Drawing Sheets

(51) Int. Cl.
  *G10L 15/28* (2013.01)
  *G10L 21/0208* (2013.01)
  *G10L 25/06* (2013.01)
  *G10L 25/84* (2013.01)
  *H04R 3/00* (2006.01)

(52) U.S. Cl.
  CPC .............. *G10L 25/06* (2013.01); *G10L 25/84* (2013.01); *H04R 3/00* (2013.01); *G10L 2021/02082* (2013.01)

(56) References Cited

U.S. PATENT DOCUMENTS

| | | | |
|---|---|---|---|
| 6,570,985 B1* | 5/2003 | Romesburg | H04B 3/23 379/406.01 |
| 7,940,685 B1* | 5/2011 | Breslau | H04L 43/0858 709/224 |
| 9,112,982 B2 | 8/2015 | Cho et al. | |
| 9,369,943 B2 | 6/2016 | Li et al. | |
| 9,693,375 B2* | 6/2017 | Bacon | H04W 84/18 |
| 10,521,185 B1* | 12/2019 | Kim | H04R 3/00 |
| 11,069,358 B1* | 7/2021 | Harper | G10L 15/26 |
| 11,404,073 B1* | 8/2022 | Zhang | G10L 21/0216 |
| 2007/0211652 A1 | 9/2007 | Minamiguchi et al. | |
| 2008/0019539 A1* | 1/2008 | Patel | H04R 3/00 381/96 |
| 2015/0030163 A1* | 1/2015 | Sokolov | H04M 3/2236 381/56 |
| 2016/0227336 A1 | 8/2016 | Sakri et al. | |
| 2016/0360332 A1 | 12/2016 | Shin et al. | |
| 2017/0372722 A1 | 12/2017 | Li et al. | |
| 2018/0132038 A1 | 5/2018 | Dickins et al. | |
| 2019/0122687 A1 | 4/2019 | Kim et al. | |
| 2020/0098346 A1* | 3/2020 | Kemmerer | G10K 11/17854 |
| 2020/0133332 A1 | 4/2020 | Patton et al. | |

FOREIGN PATENT DOCUMENTS

| | | |
|---|---|---|
| JP | 2015-039093 A | 2/2015 |
| KR | 10-2017-0052056 A | 5/2017 |
| KR | 10-2017-0076527 A | 7/2017 |
| KR | 10-2019-0034807 A | 4/2019 |
| KR | 10-2060139 B1 | 2/2020 |

OTHER PUBLICATIONS

Extended European Search Report dated Mar. 28, 2024, issued in European Patent Application No. 21915831.8.

* cited by examiner

ELECTRONIC DEVICE AND METHOD FOR CONTROLLING SPEECH INPUT/OUTPUT OF ELECTRONIC DEVICE

CROSS-REFERENCE TO RELATED APPLICATION(S)

This application is a continuation application, claiming priority under § 365(c), of an International application No. PCT/KR2021/020180, filed on Dec. 29, 2021, which is based on and claims the benefit of a Korean patent application number 10-2020-0188907, filed on Dec. 31, 2020, in the Korean Intellectual Property Office, the disclosure of which is incorporated by reference herein in its entirety

TECHNICAL FIELD

The disclosure relates to an electronic device. More particularly, the disclosure relates to a method for controlling speech input/output by an electronic device connected to an external electronic device.

BACKGROUND ART

A recent electronic device may be equipped with a smart home function and may be connected to a plurality of external electronic devices existing in a short-range by using wireless communication so that the electronic device may integrally control the external electronic devices or may be controlled by the external electronic devices. External electronic devices that perform these functions are referred to as smart home appliances, smart home electronic devices, and the like, and may provide a short-range wireless communication function so as to allow integrated control by a terminal device or the like.

In accordance with the trend of miniaturization of electronic devices, wearable devices that can be worn or mounted on a part of a user's body are being developed. These wearable devices may independently perform a specific function, and are also used as an auxiliary means for a function of a main device, such as portable terminal device of a user.

Echo refers to a phenomenon in which speech output from an electronic device is included in speech input when the electronic device concurrently performs speech input and output. Technologies for canceling such an echo phenomenon are being developed.

The above information is presented as background information only to assist with an understanding of the disclosure. No determination has been made, and no assertion is made, as to whether any of the above might be applicable as prior art with regard to the disclosure.

DISCLOSURE OF INVENTION

Technical Problem

During a call connection of an electronic device connected to an external electronic device, a so-called handsfree function may be used to provide speech transmission/reception by using the external electronic device. The electronic device may be connected to various external electronic devices, and these external electronic devices may provide a required speech transmission or speech reception function when a call is connected. When connected to an external electronic device, devices suitable for speech transmission or speech reception may be different from each other.

When connected to various external electronic devices, echo cancellation may not be easy. For example, configuration values for echo cancellation may not be the same for respective external electronic devices.

Aspects of the disclosure are to address at least the above-mentioned problems and/or disadvantages and to provide at least the advantages described below. Accordingly, an aspect of the disclosure is to provide an electronic device is connected to multiple external electronic devices, the electronic device may determine a device suitable for speech transmission or speech reception from among the multiple external electronic devices. The electronic device may improve usability with at least one external electronic device by controlling functions (e.g., speech transmission/reception and/or echo cancellation) of the at least one external electronic device.

Additional aspects will be set forth in part in the description which follows and, in part, will be apparent from the description, or may be learned by practice of the presented embodiments.

Solution to Problem

In accordance with an aspect of the disclosure, an electronic device is provided. The electronic device includes a communication module, a sensor module, a sound input module including a microphone, a sound output module including a speaker, a memory including a buffer, and a processor operatively connected to the communication module, the sensor module, the sound input module, the sound output module, and the memory, and communicatively connected to an external electronic device. The processor is configured to determine whether the external electronic device has at least one speaker and/or at least one microphone, select, if the external electronic device has a speaker, a speech reception device, which is to output reception speech, from among the electronic device and the external electronic device based on sensing information received from the sensor module when a call is connected, select, if the external electronic device has a microphone, a speech transmission device, which is to receive transmission speech, from among the electronic device and the external electronic device based on a result of comparing a speech signal received using the sound input module with a speech signal received from the microphone of the external electronic device when a call is connected, and if the speech transmission device and the speech reception device are different devices, enable at least one microphone included in the speech transmission device, disable at least one speaker included in the speech transmission device, disable at least one microphone included in the speech reception device, and enable at least one speaker included in the speech reception device, acquire an echo reference signal related to reception speech received from the speech reception device and store the echo reference signal in the buffer, determine, based on a comparison of the stored echo reference signal to transmission speech received from the speech transmission device, an echo path delay (EPD) value relating to an echo signal included in the transmission speech, and cancel the echo signal included in the transmission speech by using the echo reference signal and the determined EPD value.

In accordance with an aspect of the disclosure, a call connection method of an electronic device is provided. The call connection method includes determining whether the external electronic device has at least one speaker and/or at least one microphone, and if the external electronic device has at least one speaker, selecting a speech reception device, which is to output reception speech, from among the electronic device and the external electronic device, based on sensing information when a call is connected, if the external electronic device has at least one microphone, selecting a speech transmission device, which is to receive transmission speech, from among the electronic device and the external electronic device, based on a result of comparing a speech signal received by the electronic device with a speech signal received by the external electronic device when a call is connected, if the speech transmission device and the speech reception device are different devices, enabling at least one microphone included in the speech transmission device, disabling at least one speaker included in the speech transmission device, disabling at least one microphone included in the speech reception device, and enabling at least one speaker included in the speech reception device, acquiring and storing an echo reference signal related to reception speech received from the speech reception device, based on a comparison of the stored echo reference signal to transmission speech received from the speech transmission device, determining an echo path delay (EPD) value relating to an echo signal included in the transmission speech, and canceling the echo signal included in the transmission speech by using the echo reference signal and the determined EPD value.

Advantageous Effects of Invention

According to various embodiments, in a situation where an electronic device is connected to various external electronic devices, call quality improvement can be expected by selecting a device most suitable for speech transmission and/or a device most suitable for speech reception from among the electronic device and the external electronic devices. When the electronic device is connected to a call, a user experience can be improved during the call connection, by actively controlling a connected external electronic device. Call quality improvement can be expected by actively controlling various echoes that may occur during speech transmission or speech reception using an external electronic device.

In addition, various effects directly or indirectly identified via the document may be provided.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF DRAWINGS

The above and other aspects, features, and advantages of certain embodiments of the disclosure will be more apparent from the following description taken in conjunction with the accompanying drawings, in which.

Throughout the drawings, it should be noted that like reference numbers are used to depict the same or similar elements, features, and structures.

MODE FOR THE INVENTION

The following description with reference to the accompanying drawings is provided to assist in a comprehensive understanding of various embodiments of the disclosure as defined by the claims and their equivalents. It includes various specific details to assist in that understanding, but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but are merely used by the inventor to enable a clear and consistent understanding of the disclosure. Accordingly, it should be apparent to those skilled in the art that the following description of various embodiments of the disclosure is provided for illustration purposes only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
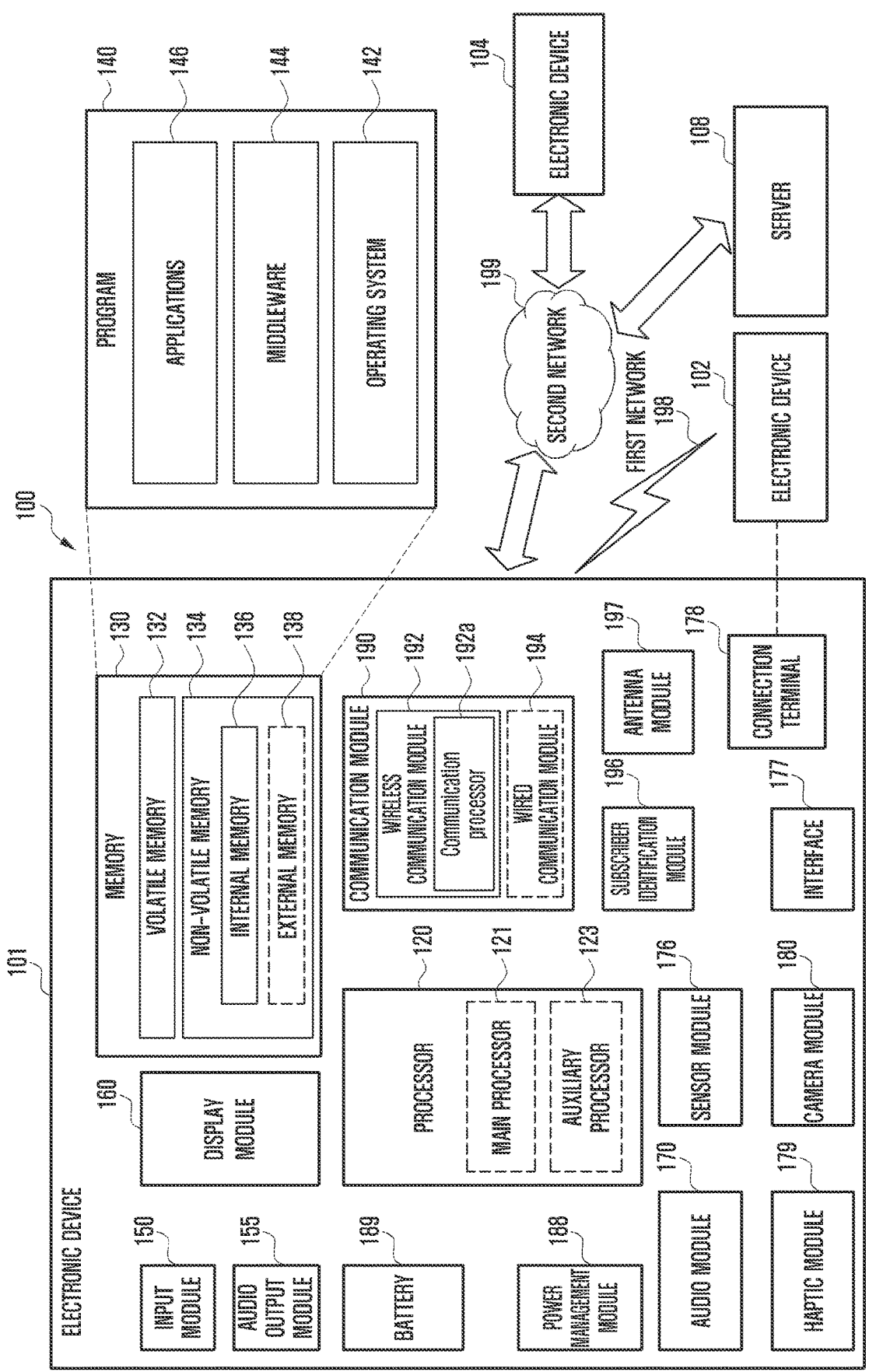
FIG. 1 is a block diagram illustrating an electronic device in a network environment according to an embodiment of the disclosure.

FIG. 1 is a block diagram illustrating an electronic device 101 in a network environment 100 according to an embodiment of the disclosure.

Referring to FIG. 1, the electronic device 101 in the network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input 1module 150, a sound output 1module 155, a display 1module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments, at least one of the components (e.g., the 11 connecting terminal 178) may be omitted from the electronic device 101, or one or more other components may be added in the electronic device 101. In some embodiments, some of the components (e.g., the sensor module 176, the camera module 180, or the antenna module 197) may be implemented as a single component (e.g., the display module 160). 11

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display 1 module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor 192a) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input 1module 150 may receive a command or data to be used by another component (e.g., the processor 120) of the electronic device 101, from the outside (e.g., a user) of the electronic device 101. The input 1module 150 may include, for example, a microphone, a mouse, a keyboard, a key (e.g., a button), or a digital pen (e.g., a stylus pen).

The sound output 1module 155 may output sound signals to the outside of the electronic device 101. The sound output 1module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display 1module 160 may visually provide information to the outside (e.g., a user) of the electronic device 101. The display 1module 160 may include, for example, a display, a hologram device, or a projector and control circuitry to control a corresponding one of the display, hologram device, and projector. According to an embodiment, the display 1module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input 1module 150, or output the sound via the sound output 1module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly.

According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5th generation (5G) network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

Figure 2:
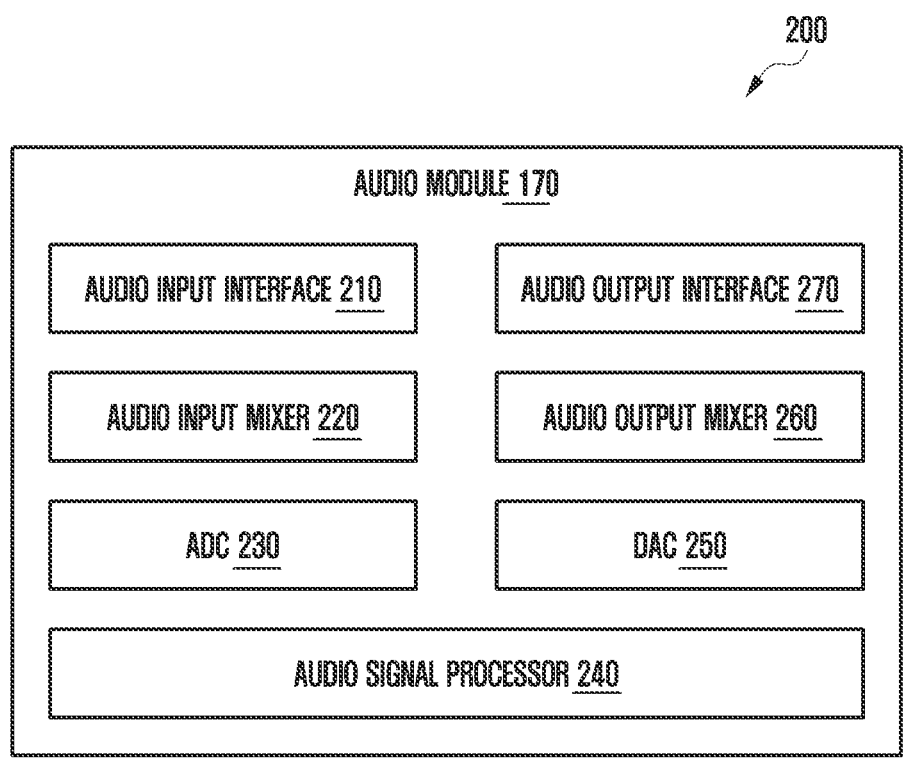
FIG. 2 is a block diagram illustrating the audio module according to an embodiment of the disclosure.

FIG. 2 is a block diagram 200 illustrating the audio module 170 according to an embodiment of the disclosure.

Referring to FIG. 2, the audio module 170 may include, for example, an audio input interface 210, an audio input mixer 220, an analog-to-digital converter (ADC) 230, an audio signal processor 240, a digital-to-analog converter (DAC) 250, an audio output mixer 260, or an audio output interface 270.

The audio input interface 210 may receive an audio signal corresponding to a sound obtained from the outside of the electronic device 101 via a microphone (e.g., a dynamic microphone, a condenser microphone, or a piezo microphone) that is configured as part of the input module 150 or separately from the electronic device 101. For example, if an audio signal is obtained from the external electronic device 102 (e.g., a headset or a microphone), the audio input interface 210 may be connected with the external electronic device 102 directly via the connecting terminal 178, or wirelessly (e.g., Bluetooth™ communication) via the wireless communication module 192 to receive the audio signal. According to an embodiment, the audio input interface 210 may receive a control signal (e.g., a volume adjustment signal received via an input button) related to the audio signal obtained from the external electronic device 102. The audio input interface 210 may include a plurality of audio input channels and may receive a different audio signal via a corresponding one of the plurality of audio input channels, respectively. According to an embodiment, additionally or alternatively, the audio input interface 210 may receive an audio signal from another component (e.g., the processor 120 or the memory 130) of the electronic device 101.

The audio input mixer 220 may synthesize a plurality of inputted audio signals into at least one audio signal. For example, according to an embodiment, the audio input mixer 220 may synthesize a plurality of analog audio signals inputted via the audio input interface 210 into at least one analog audio signal.

The ADC 230 may convert an analog audio signal into a digital audio signal. For example, according to an embodiment, the ADC 230 may convert an analog audio signal received via the audio input interface 210 or, additionally or alternatively, an analog audio signal synthesized via the audio input mixer 220 into a digital audio signal.

The audio signal processor 240 may perform various processing on a digital audio signal received via the ADC 230 or a digital audio signal received from another component of the electronic device 101. For example, according to an embodiment, the audio signal processor 240 may perform changing a sampling rate, applying one or more filters, interpolation processing, amplifying or attenuating a whole or partial frequency bandwidth, noise processing (e.g., attenuating noise or echoes), changing channels (e.g., switching between mono and stereo), mixing, or extracting a specified signal for one or more digital audio signals. According to an embodiment, one or more functions of the audio signal processor 240 may be implemented in the form of an equalizer.

The DAC 250 may convert a digital audio signal into an analog audio signal. For example, according to an embodiment, the DAC 250 may convert a digital audio signal processed by the audio signal processor 240 or a digital audio signal obtained from another component (e.g., the processor (120) or the memory (130)) of the electronic device 101 into an analog audio signal.

The audio output mixer 260 may synthesize a plurality of audio signals, which are to be outputted, into at least one audio signal. For example, according to an embodiment, the audio output mixer 260 may synthesize an analog audio signal converted by the DAC 250 and another analog audio signal (e.g., an analog audio signal received via the audio input interface 210) into at least one analog audio signal.

The audio output interface 270 may output an analog audio signal converted by the DAC 250 or, additionally or alternatively, an analog audio signal synthesized by the audio output mixer 260 to the outside of the electronic device 101 via the sound output module 155. The sound output module 155 may include, for example, a speaker, such as a dynamic driver or a balanced armature driver, or a receiver. According to an embodiment, the sound output module 155 may include a plurality of speakers. In such a case, the audio output interface 270 may output audio signals having a plurality of different channels (e.g., stereo channels or 5.1 channels) via at least some of the plurality of speakers. According to an embodiment, the audio output interface 270 may be connected with the external electronic device 102 (e.g., an external speaker or a headset) directly via the connecting terminal 178 or wirelessly via the wireless communication module 192 to output an audio signal.

According to an embodiment, the audio module 170 may generate, without separately including the audio input mixer 220 or the audio output mixer 260, at least one digital audio signal by synthesizing a plurality of digital audio signals using at least one function of the audio signal processor 240.

According to an embodiment, the audio module 170 may include an audio amplifier (not shown) (e.g., a speaker amplifying circuit) that is capable of amplifying an analog audio signal inputted via the audio input interface 210 or an audio signal that is to be outputted via the audio output interface 270. According to an embodiment, the audio amplifier may be configured as a module separate from the audio module 170.

Figure 3:
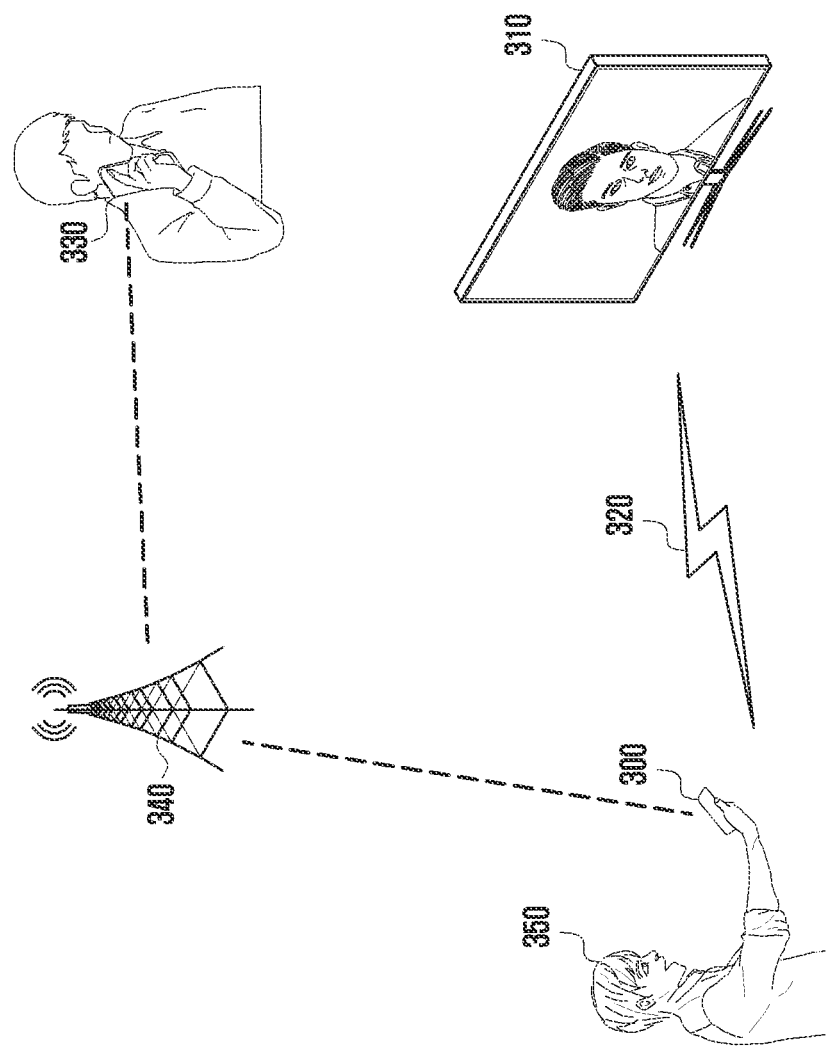
FIG. 3 is a diagram illustrating an operation of controlling a speech transmission device and a speech reception device when an electronic device is connected to an external electronic device according to an embodiment of the disclosure.

FIG. 3 is a diagram illustrating an operation of controlling a speech transmission device and a speech reception device when an electronic device is connected to an external electronic device according to an embodiment of the disclosure.

Referring to FIG. 3, an electronic device 300 (e.g., the electronic device 101 of FIG. 1) may be communicatively connected to an external electronic device 310 by using short-range wireless communication 320 (e.g., the first network 198 of FIG. 1). According to an embodiment of the disclosure, the electronic device 300 may be connected to the external electronic device 310 by using short-range wireless communication, such as Bluetooth, Bluetooth low energy (BLE), and/or Wi-Fi. For example, the external electronic device 310 may be an electronic device existing within a short-range from a user 350 and/or the electronic device 300. The user 350 may refer to a person using the electronic device 300 or a device (e.g., artificial intelligence electronic device) using the electronic device 300.

The external electronic device 310 may have a built-in communication module (e.g., the communication module 190 of FIG. 1) for performing wireless communication with the electronic device 300. The external electronic device 310 may be an electronic device having a speech output interface (e.g., speaker or audio output interface 270 of FIG. 2) or a speech input interface (e.g., microphone or audio input interface 210 of FIG. 2). The electronic device 300 may be connected to the external electronic device 310 by using short-range wireless communication so as to control an operation of the external electronic device 310 and may receive data from the external electronic device 310 or may transmit, to the external electronic device 310, various types of information including data for controlling of the external electronic device. For example, the electronic device 300 may transmit a certain audio signal to the external electronic device 310 and may control the external electronic device 310 to output the audio signal received from the electronic device 300. As another example, the electronic device 300 may receive, from the external electronic device 310, an audio signal related to speech information input to the external electronic device 310.

The electronic device 300 may provide a call connection function. The call connection function may refer to a function of connecting a call to another electronic device (e.g., counterpart terminal 330) that provides a call connection function. The electronic device 300 may be communicatively connected to the counterpart terminal 330 by using long-range wireless communication 340 (e.g., the second network 199 of FIG. 1). The electronic device 300 may be connected to the counterpart terminal 330 by using long-range wireless communication, such as cellular communication, LTE, LTE-A, 5G, or Internet communication, so as to perform a call connection. The call connection may be made via long-range wireless communication supported by the electronic device 300 and the counterpart terminal 330.

If a call connection is performed when the external electronic device 310 is connected, the electronic device 300 may control a speech transmission device and a speech reception device. The speech transmission device may refer to a device suitable for speech transmission among the electronic device 300 and the external electronic device 310 connected to the electronic device 300. The electronic device 300 may select a speech transmission device, based on sensing information acquired from a sensor included in the electronic device 300, state information of a speech input interface (e.g., microphone) included in each of the electronic device 300 and the external electronic device 310, and analysis information for an audio signal of transmission speech received by each of the electronic device 300 and the external electronic device 310. Analysis of the audio signal may include, for example, calculating a signal-to-noise ratio (SNR) value, calculating a speech-to-echo ratio (SER) value, or comparing the calculated SNR or SER value.

The speech reception device may refer to a device suitable for speech reception among the electronic device 300 and the external electronic device 310 connected to the electronic device 300. The electronic device 300 may compare the electronic device 300 with the external electronic device 310 and may select a speech reception device, by using sensing information acquired by the electronic device 300 or information obtained by estimating speech that the user 350 can hear from the electronic device 300 or the external electronic device 310. The electronic device 300 may select a speech transmission device and/or a speech reception device, based on various data, such as the user's behavior, location, state information of the electronic device 300 and/or the external electronic device 310, and hardware information of the electronic device 300 or the external electronic device 310.

If a speech reception device and a speech transmission device are selected from among the electronic device 300 and the connected external electronic device 310, the electronic device 300 may disable a speech output interface of the selected speech transmission device, and may enable only a speech input interface of the speech transmission device. The electronic device 300 may enable a speech output interface of the selected speech reception device and disable a speech input interface of the speech reception device. If there are multiple connected external electronic devices, the electronic device 300 may control to disable both a speech input interface and a speech output interface of an external electronic device that is not selected as a speech transmission device and/or speech reception device.

Referring to FIG. 3, the user 350 may perform a call connection based on a video call using the electronic device 300. When the external electronic device 310 is connected, if the external electronic device 310 is determined to be suitable for speech reception, the electronic device 300 may select the external electronic device 310 as a speech reception device and may select the electronic device 300 as a speech transmission device. For example, the electronic device 300 may receive an audio signal relating to a counterpart speech from the counterpart terminal 330, and may transmit the audio signal for the counterpart speech to the connected external electronic device 310. The electronic device 300 may control to enable only the speech output interface of the external electronic device 310 and to disable the speech input interface of the external electronic device 310 so as to allow only the external electronic device 310 to output reception speech (e.g., counterpart speech) of the counterpart terminal 330. If the electronic device 300 is selected as a speech transmission device, only the speech input interface of the electronic device 300 may be enabled, and the speech output interface may be disabled so as to receive reception speech related to speech of the user 350. The electronic device 300 may process a signal for the received reception speech so as to transmit the processed signal to the counterpart terminal 330.

Figure 4:
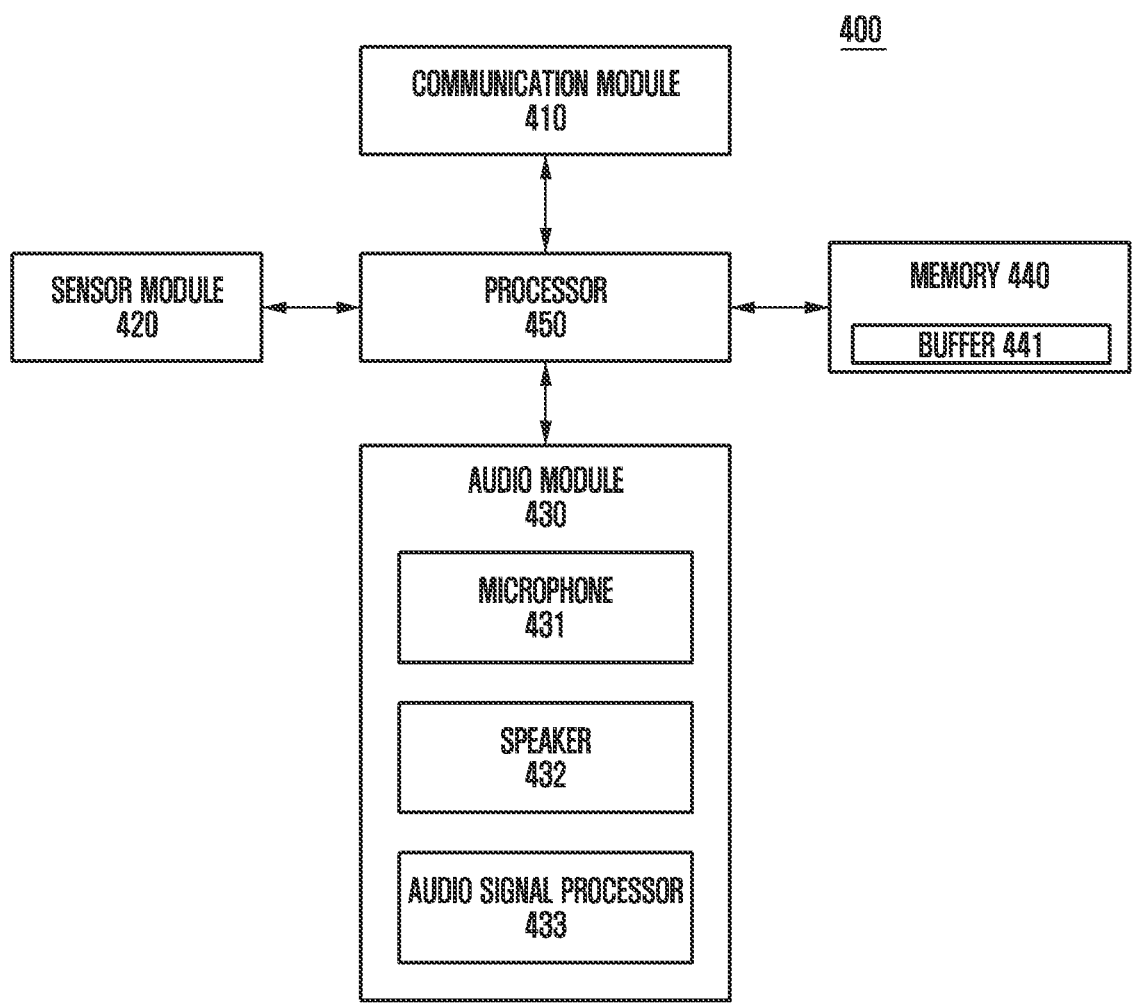
FIG. 4 is a block diagram of an electronic device according to an embodiment of the disclosure.

FIG. 4 is a block diagram of an electronic device according to an embodiment of the disclosure.

Referring to FIG. 4, an electronic device 400 (e.g., electronic device 101 of FIG. 1 or electronic device 300 of FIG. 3) may include a communication module 410, a sensor module 420, and an audio module 430, a memory 440, and a processor 450. According to other embodiments of the disclosure, at least one of the illustrated elements may be omitted or substituted. The electronic device 400 according to various embodiments may include all or a part of the configurations and/or functions of the electronic device 101 of FIG. 1.

The communication module 410 may perform a communication connection with various electronic devices (e.g., external electronic device 310 or counterpart terminal 330 of FIG. 3). The communication module 410 may include at least a part of the functions and/or configurations of the communication module 190 of FIG. 1. The communication module 410 may support short-range wireless communication (e.g., first network 198 of FIG. 1) and may perform connection to an external electronic device (e.g., external electronic device 310 of FIG. 3) by using short-range wireless communication. The electronic device 300 may be connected to an external electronic device (e.g., external electronic device 310 of FIG. 3) by using short-range wireless communication, such as Bluetooth, Bluetooth low energy (BLE), and/or Wi-Fi. The electronic device 400 may be connected to the external electronic device 310 by using short-range wireless communication so as to control an operation of the external electronic device 310 and may receive data from the external electronic device 310 or may transmit, to the external electronic device 310, various types of information including data for controlling of the external electronic device. For example, the electronic device 400 may transmit a certain audio signal (e.g., reception speech) to the external electronic device 310 and may control the external electronic device 310 to output the audio signal received from the electronic device 400. As another example, the electronic device 400 may receive, from the external electronic device 310, an audio signal (e.g., transmission speech) related to speech information input to the external electronic device 310.

The communication module 410 may support long-range wireless communication (e.g., second network 199 of FIG. 1) and may perform connection to a counterpart terminal (e.g., counterpart terminal 330 of FIG. 3) by using long-range wireless communication. The communication module 410 is not limited with respect to long-range communication supported by the communication module 410 and may support various communication schemes, such as a cellular network (e.g., 5G and LTE-A), LAN, or the Internet. The electronic device 400 may be connected to a counterpart terminal (e.g., counterpart terminal 330 of FIG. 3) by using long-range wireless communication and may perform a call connection. The communication module 410 may, using long-range wireless communication, receive information necessary for a call connection, which includes an audio signal (e.g., reception speech) related to speech of a counterpart from the counterpart terminal 330 and transmit information necessary for a call connection, which includes an audio signal (e.g., transmission speech) related to speech of a user (e.g., user 350 of FIG. 3) to the counterpart terminal 330.

The sensor module 420 may sense an operation state (e.g., power or temperature) of the electronic device 400 or an external environmental state (e.g., user state), and may generate an electrical signal and/or a data value corresponding to the sensed state. The sensor module 420 may include at least a part of the functions and/or configurations of the sensor module 176 of FIG. 1. The sensor module 420 may include various sensors, such as a gesture sensor, a gyro sensor, an air pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor. The sensor module 420 may generate sensing information for determination of a user's state, a user location, and/or a user motion (e.g., gesture) by using various provided sensors.

The audio module 430 may convert a sound into an electric signal or, conversely, may convert an electric signal into a sound. The audio module 430 may include at least a part of the configurations and/or functions of the audio module 170 of FIG. 1. The audio module 430 may include at least a part of configurations and/or functions of the audio module 170 of FIG. 2. The audio module 430 may include a microphone 431, a speaker 432, and an audio signal processor 433. The audio module 430 may receive a speech (e.g., transmission speech) from the outside of the electronic device 400 by using the microphone 431. The microphone 431 may include at least a part of the configurations and/or functions of the input module 150 of FIG. 1. The audio module 430 may convert speech acquired by the microphone 431 into an electric signal (e.g., digital audio signal) and may transfer the converted digital audio signal to another element (e.g., processor 450) of the electronic device 400. The audio module 430 may output speech to the outside of the electronic device 400 by using the speaker 432. The speaker 432 may include at least a part of the configurations and/or functions of the sound output module 155 of FIG. 1. The audio module 430 may convert a digital audio signal into an analog speech signal and may output the converted analog speech signal to the outside by using the speaker 432. The audio module 430 may receive a digital audio signal from another element (e.g., processor 450) of the electronic device 400 and may output a speech signal corresponding thereto to the outside.

The audio signal processor 433 may perform various processing on an input digital audio signal or a digital audio signal received from another element (e.g., processor 450) of the electronic device 400. For example, the audio signal processor 433 may apply an adaptive filter to transmission speech. The audio signal processor 433 may input an echo path delay (EPD) to the adaptive filter so as to apply the same to the transmission speech. The audio signal processor 433 may cancel an echo by adding or subtracting an output value of the adaptive filter to or from the transmission speech.

The memory 440 is for temporarily or permanently storing digital data, and may include at least a part of the configurations and/or functions of the memory 130 of FIG. 1. The memory 440 may store at least a part of the program 140 of FIG. 1. The memory 440 may store various instructions that may be executed by the processor 450. The instructions may include control commands, such as logical operations and data input/output that may be recognized and executed by the processor 450. Although there is no limitation on the type and/or amount of data that the memory 440 can store, in this document, only a method for controlling speech transmission and speech reception and a configuration and a function of the memory, which are related to the operation of the processor 450 performing the method, will be described. The memory 440 may include a buffer 441. The buffer 411 may indicate, for digital data, a partial area of the memory 440, and may temporarily store data. The memory 440 may store data (e.g., echo path delay (EPD) and/or echo reference signal) related to an audio signal in the buffer for a predetermined time so as to be temporarily used, and may continuously update and store data.

The processor 450 may process data or operations relating to communication and/or control each element of the electronic device 300. The processor 450 may include at least a part of the configurations and/or functions of the processor 120 of FIG. 1. The processor 450 may be operatively, electrically, and/or functionally connected to the elements of the electronic device 400, such as the communication module 410, the sensor module 420, the audio module 430, and the memory 440. Although there are no limitation on the type and/or amount of operations, calculations, and data processing that the processor 450 can perform, in this document, only a method for providing a user and speech-based interaction according to various embodiments, and a configuration and a function of the processor 450, which are related to the operation of performing the method, will be described.

The processor 450 may determine whether an external electronic device (e.g., external electronic device 310 of FIG. 3) includes a speaker and/or a microphone. When connection to the external electronic device 310 is performed, the processor 450 may receive information related to the external electronic device 310, such as device information, hardware information, and/or software information of the external electronic device 310. The processor 450 may determine whether the connected external electronic device 310 has an interface (e.g., mic or microphone) through which speech may be input, based on information related to the external electronic device 310. The processor 450 may determine whether the external electronic device 310 has an interface (e.g., speaker) capable of outputting speech. When information on whether the external electronic device 310 includes a microphone and/or a speaker is required, the processor 450 may identify the information. For example, when a call connection request is received from a counterpart terminal (e.g., counterpart terminal 330 of FIG. 3) or is received from a user, or as soon as the external electronic device 310 is connected, the processor 450 may determine whether the external electronic device 310 includes a microphone and/or a speaker.

The processor 450 may select a speech transmission device and/or a speech reception device. If the external electronic device 310 includes a microphone and/or a speaker, the processor 450 may select, as a speech transmission device, a device suitable for performing speech transmission and may select, as a speech reception device, a device suitable for speech reception, from among the external electronic device 310 and the electronic device 400. According to an embodiment of the disclosure, the processor 450 may select, as a speech transmission device, only one of the electronic device 400 and the external electronic device 310, and may select, as a speech reception device, only one of the electronic device 400 and the external electronic device 310. For example, if both devices are selected as speech transmission devices, duplication between speech signals acquired by respective devices, an echo phenomenon, and the like may occur, and selecting only one device may be appropriate for a call connection. Similarly, even in a case of a speech reception device, selecting only one of respective devices as a speech reception device may be appropriate for a call connection in order to prevent duplication between speech signals output by the respective devices, an echo phenomenon, and the like.

The processor 450 may determine a device suitable for speech transmission by comparing a speech signal received in the electronic device 400 with a speech signal received in the external electronic device 310. For example, the processor 450 may calculate a signal-to-noise ratio (SNR) value, based on a speech signal acquired from the audio module 430 of the electronic device 400. The processor 450 may receive, from the external electronic device 310, a speech signal acquired by the external electronic device 310 having a microphone and may calculate an SNR value on the basis of the received speech signal. The processor 450 may select a device suitable for speech transmission, by comparing SNR values of respective speech signals acquired from the electronic device 400 and the external electronic device 310. The processor 450 may calculate speech-to-echo ratio (SER) values of the speech signals acquired by the electronic device 400 and the external electronic device 310, respectively, and may select a speech transmission device by comparing the respective SER values. According to an embodiment, the processor 450 may determine a device having a larger identified SNR or SER value, as a device more suitable for speech transmission.

The processor 450 may measure, using sensing information acquired from the sensor module 420, a distance between a user (e.g., user 350 of FIG. 3) and the electronic device 400 and a distance between the external electronic device 310 and the electronic device 400. The processor 450 may measure the distance between the external electronic device 310 and the user 350, based on the distance from the electronic device 400 to the external electronic device 310 and the distance from the electronic device 400 to the user 350. The processor 450 may select, as a speech transmission device, a closer device among the external electronic device 310 and the electronic device 400, based on information of the distances between the electronic device 400, the user 350, and the external electronic device 310, respectively.

The processor 450 may determine a microphone reception sensitivity of each device on the basis of device information of the electronic device 400 or information on the audio module 430, which is stored in the memory 440, and device information of the external electronic device 310, which is received from the external electronic device 310, and may select a speech transmission device on the basis of information on the microphone reception sensitivity.

The processor 450 may estimate an SNR value or an SER value, based on the microphone reception sensitivity and the distance of the electronic device 400 or external electronic device 310. Information on an estimation value of an SNR or SER value based on a predetermined distance and reception sensitivity may be previously stored in the memory 440.

The processor 450 may select a speech transmission device, based on any one of or a combination of at least some of information relating to the distance of the external electronic device 310 and the electronic device 400 and/or information relating to sound (e.g., SNR value or SER value), and device information on each device.

The processor 450 may identify a user's location, motion, gesture, or environment information (e.g., temperature, humidity, or space information) based on sensing information acquired from the sensor module 420, and may select a speech transmission device on the basis of the user's location, motion, gesture, or environment information identified based on the sensing information.

The processor 450 may determine a device suitable for speech reception by comparing a speech signal output from the electronic device 400 with a speech signal output from the external electronic device 310. For example, the processor 450 may calculate a signal-to-noise ratio (SNR) value, based on a speech signal output from the audio module 430 of the electronic device 400. The processor 450 may identify information (e.g., information relating to a range of volume that can be output) on speech signal output ranges of respective devices and may identify sound information (e.g., SNR value) for speech signals output by the respective device, based on device information of the electronic device 400 or information on the audio module 430, which is stored in the memory 440, and device information of the external electronic device 310, which is received from the external electronic device 310. The processor 450 may estimate an SNR value or an SER value, based on information of the speech signal output range and the distance of the electronic device 400 or external electronic device 310. Information on an estimation value of an SNR value based on a predetermined distance and speech output range may be previously stored in the memory 440. The processor 450 may determine a device having a larger SNR value, as a device more suitable for speech reception.

The processor 450 may measure, using sensing information acquired from the sensor module 420, a distance between a user (e.g., user 350 of FIG. 3) and the electronic device 400 and a distance between the external electronic device 310 and the electronic device 400. The processor 450 may measure the distance between the external electronic device 310 and the user 350, based on the distance from the electronic device 400 to the external electronic device 310 and the distance from the electronic device 400 to the user 350. The processor 450 may select, as a speech reception device, a closer device among the external electronic device 310 and the electronic device 400, based on information of the distances between the electronic device 400, the user 350, and the external electronic device 310, respectively.

The processor 450 may select a speech reception device, based on any one of or a combination of at least some of information relating to the distance of the external electronic device 310 and the electronic device 400 and/or information relating to sound (e.g., SNR value or SER value), and device information on each device.

The processor 450 may identify a user's location, motion, gesture, or environment information (e.g., temperature, humidity, or space information) based on sensing information acquired from the sensor module 420, and may select a speech reception device on the basis of the user's location, motion, gesture, or environment information identified based on the sensing information.

The processor 450 may control a speech input interface and/or speech output interface of a speech transmission device and/or speech reception device. When the processor 450 selects each of a speech reception device and a speech transmission device from among the electronic device 400 and the external electronic device 310, the speech transmission device and the speech reception device may be the same electronic device but may be different electronic devices. If the speech transmission device and speech reception device selected from among the electronic device 400 and the external electronic device 310 are different from each other, the processor 450 may control to enable only a speech input interface (e.g., microphone) of the speech transmission device and to disable a speech input interface of the speech reception device. The processor 450 may control to enable only a speech output interface (e.g., speaker) of the speech reception device and to disable a speech output interface of the speech reception device.

If there are multiple external electronic devices 310, the processor 450 may control to enable only a speech output interface provided in one device selected as a speech reception device and to disable speech output interfaces of all the other devices and may control to enable only a speech input interface provided in one device selected as a speech transmission device and to disable speech input interfaces of all the other devices, from among the electronic device 400 and the multiple external electronic devices 310. If the same device is selected as a speech transmission device and a speech reception device, the processor 450 may control to enable only a speech input interface and a speech output interface of a device selected as the speech transmission device and speech reception device, and to disable speech input interfaces and speech output interfaces of all the other devices.

The processor 450 may transmit, to the connected external electronic device 310, a signal or command for controlling of speech input/output of a speech interface (e.g., microphone or speaker) of the external electronic device 310. A speech transmission device and a speech reception device selected by the processor 450 may be the same device, and there is no limitation that the electronic device 400 and all other external electronic devices 310 including a speech interface (e.g., microphone or speaker), which are connected to the electronic device 400, may be selected as a speech transmission device or a speech reception device. However, in this document, for convenience, descriptions will be based on a case where a speech transmission device and a speech reception device are different from each other.

The processor 450 may cancel an echo that may occur in a speech transmission device. According to various embodiments, an echo may occur when a speech transmission device receives transmission speech. For example, reception speech output by a speech reception device may be input to a speech transmission device and may act as an echo. The electronic device 400 may be connected to a variety of external electronic devices, and a speech transmission device or a speech reception device selected from the external electronic devices may be different from each other, and thus a value relating to a characteristic (e.g., echo path delay (EPD)) of an echo may also vary. The processor 450 may adaptively cancel echoes having various characteristics.

The processor 450 may acquire an echo reference signal and may store the acquired echo reference signal in the memory 440. The echo reference signal may be a signal to be output by a speech reception device. For example, the echo reference signal may be reception speech. The echo reference signal may be a signal obtained by pre-processing (e.g., scaling) the reception speech. The processor 450 may receive an echo reference signal from the external electronic device 310. If the external electronic device 310 is selected as a speech reception device, the processor 450 may receive a signal related to a counterpart speech from a counterpart terminal (e.g., counterpart terminal 330 of FIG. 3) and may transmit the signal to the external electronic device 310, and the external electronic device 310 may pre-process the received signal related to the counterpart speech in order to output reception speech by using a provided speaker. For example, the processor 450 may receive, as an echo reference signal from the external electronic device 310, a signal that the external electronic device 310 has processed to output reception speech. The processor 450 may acquire, as an echo reference signal, a signal related to a counterpart speech received from the counterpart terminal 330 or a signal obtained by pre-processing the signal. The processor 450 may store the acquired echo reference signal in the memory 440. The processor 450 may update and store the acquired echo reference signal in the buffer 441.

The processor 450 may check an echo path delay (EPD) value of an echo included in transmission speech. An EPD value may be, for example, a difference between an arrival time of an echo reference signal, which is received from a speech reception device, to the processor 450 and a time at which a speech signal output from the speech reception device is acquired by a speech transmission device and arrives at the processor 450. An audio signal may be transferred through a different path for each device, and a slight difference in arrival time may occur. An EPD value may have a specific correlation with the distance of a speech transmission device and speech reception device. For example, the EPD value may have a positive correlation with the distance of a speech transmission device and speech reception device. Alternatively, the EPD value may be related to a speed at which a speech reception device processes and outputs reception speech. An EPD value may vary according to various variables, such as distances, states, configuration environments, and surrounding environments (e.g., surrounding structure) of a speech transmission device and a speech reception device. The processor 450 may determine an EPD value and may apply the determined EPD value to an echo reference signal. The processor 450 may cancel the echo by applying the EPD value to the echo reference signal, inputting the same to the adaptive filter, and adding or subtracting an output value of the adaptive filter to or from transmission speech. According to one embodiment of the disclosure, an output of an adaptive filter may be updated based on a least mean square (LMS), normalized least mean square (NLMS), or root mean square (RMS) algorithm.

The processor 450 may determine, as the EPD value, an initial EPD value stored in the memory 440. The memory 440 may store a preconfigured EPD value, or may estimate an EPD value when connected to the external electronic device 310. The processor 450 may store the estimated EPD value in the memory 440 and may identify the existing estimated EPD value stored in the memory 440 when connected to the external electronic device 310. The processor 450 may estimate the EPD value. The processor 450 may store an echo reference signal in the buffer 441 and may continuously update the adaptive filter by applying the EPD value. The processor 450 may determine whether the EPD value needs to be changed. If the echo reference signal is input beyond a processing range (e.g., length) of the adaptive filter (i.e., if the EPD exceeds the processing range of the adaptive filter), the processor 450 may determine that the EPD needs to be changed. If no echo cancellation is performed by a specific threshold value or greater, for example, if an echo signal is detected to have a magnitude equal to or greater than the specific threshold value, the processor 450 may determine that the EPD needs to be changed.

The processor 450 may continuously update the echo reference signal in the buffer by applying the configured EPD value. The processor 450 may increase or decrease a predetermined time interval from the existing EPD value and may apply the EPD value to the echo reference. The processor 450 may apply, to the echo reference signal, respective time values for increasing and decreasing the existing EPD value by a certain time interval, and may calculate respective coefficients of correlations between transmission speech and the echo reference signals, to which the respective time values have been applied. The time value to increase or decrease the existing EPD value may be a value greater than the length of the adaptive filter. The time value for an increase or a decrease may be a multiple of the length of the adaptive filter. The processor 450 may, based on comparison of the calculated correlation coefficient values, change the EPD in a direction having a largest correlation coefficient, store the changed EPD as an estimated EPD, and shift the echo reference signal within buffer 441. If all of the calculated correlation coefficient values are smaller than a threshold value, the processor 450 may change the time value to increase or decrease the EPD. For example, there may be a need to search a wider range from the existing EPD value. If the calculated correlation coefficient values are smaller than a certain range, the processor 450 may repeat the same estimation by applying a time value (e.g., second time value) larger than a first applied time value (e.g., first time value). The processor 450 may estimate (e.g., first estimation) an EPD value (e.g., first EPD estimation value) by using a time value greater than the length of the adaptive filter, and then may perform precise estimation (e.g., second estimation) using a small time value. The second estimation may be performed, for example, by applying a time value (e.g., third time value) smaller than the length of the adaptive filter. The first time value may be smaller than the third time value, and the third time value may be smaller than the second time value. The processor 450 may increase or decrease the third time value with respect to the first EPD estimation value acquired in the first estimation, may apply each of an increased value, a non-increased value, and a decreased value to the echo reference signal, and then may calculate a correlation coefficient between transmission speech and each applied signal. The processor 450 may estimate (e.g., second estimation) an EPD by comparing respective correlation coefficients and increasing or decreasing the EPD in a direction having a largest correlation coefficient value. According to an embodiment, the processor 450 may estimate the EPD value and may determine the estimated EPD value.

The processor 450 may update an adaptive filter, based on transmission speech and a signal in which the echo reference signal is delayed by the determined EPD value. The output of the adaptive filter may be updated based on a least mean square (LMS), normalized least mean square (NLMS), or root mean square (RMS) algorithm.

The processor 450 may cancel an echo by using an output value of the adaptive filter. The processor 450 may cancel an echo by applying an EPD value to an echo reference signal, inputting the same to an adaptive filter, and adding or subtracting an output value of the adaptive filter to or from transmission speech. The processor 450 may transmit the transmission speech, in which an echo is canceled, to a counterpart terminal (e.g., counterpart terminal 330 of FIG. 3).

Figure 5:
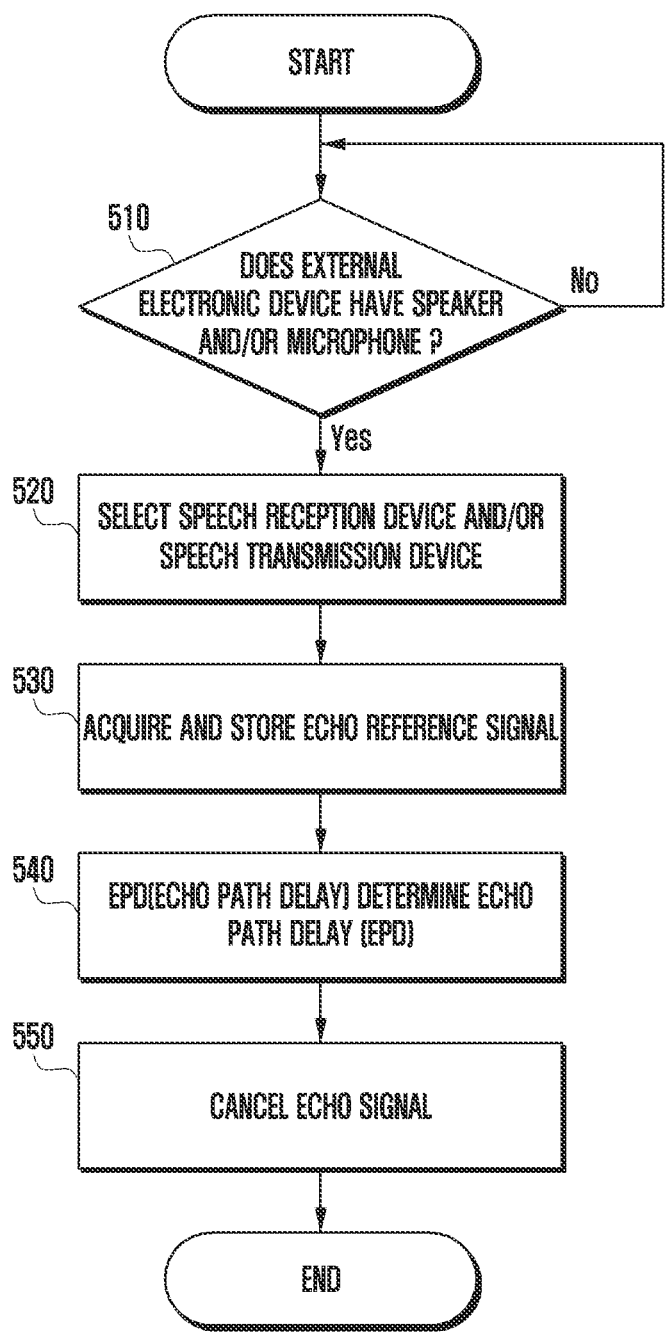
FIG. 5 is a flowchart for an operation of controlling a speech transmission device and a speech reception device by an electronic device according to an embodiment of the disclosure.

FIG. 5 is a flowchart for an operation of controlling a speech transmission device and a speech reception device by an electronic device according to an embodiment of the disclosure.

Referring to FIG. 5, operations of controlling a speech transmission device and a speech reception device by an electronic device (e.g., electronic device 400 of FIG. 4) may be described as respective operations of a processor (e.g., processor 450 of FIG. 4) included in the electronic device 400.

In operation 510, the processor 450 may determine whether an external electronic device (e.g., external electronic device 310 of FIG. 3) includes a speaker and/or a microphone. When connection to the external electronic device 310 is performed, the processor 450 may receive information related to the external electronic device 310, such as device information, hardware information, and/or software information of the external electronic device 310.

The processor 450 may determine whether the connected external electronic device 310 has an interface (e.g., mic or microphone) through which speech may be input, based on the information related to the external electronic device 310. The processor 450 may determine whether the external electronic device 310 has an interface (e.g., speaker) capable of outputting speech. When information on whether the external electronic device 310 includes a microphone and/or a speaker is required, the processor 450 may identify the information. For example, when a call connection request is received from a counterpart terminal (e.g., counterpart terminal 330 of FIG. 3) or is received from a user, or as soon as the external electronic device 310 is connected, the processor 450 may determine whether the external electronic device 310 includes a microphone and/or a speaker.

If an external electronic device (e.g., external electronic device 310 of FIG. 3) includes a speaker and/or a microphone, the processor 450 may perform operation 520. If an external electronic device (e.g., external electronic device 310 of FIG. 3) does not include a speaker and/or a microphone, the processor 450 may repeatedly perform operation 510.

According to an embodiment of the disclosure (not shown), if an external electronic device (e.g., external electronic device 310 of FIG. 3) does not include a speaker and/or a microphone, the processor 450 may determine whether a communication connection (e.g., first network 198 or second network 199 of FIG. 1) has been made to another external electronic device (e.g., electronic device 102 or electronic device 104 of FIG. 1). For example, if a communication connection is made to another external electronic device other than the external electronic device, the processor 450 may determine whether the other external electronic device includes a speech interface (e.g., speaker and/or mic (microphone)). If the other external electronic device includes a speech interface (e.g., speaker and/or mic (microphone)), operations 520 to 550 may be performed based on the electronic device 400 and the other external electronic device.

In operation 520, the processor 450 may select a speech reception device and/or a speech transmission device. If the external electronic device 310 includes a microphone and/or a speaker, the processor 450 may select, as a speech transmission device, a device suitable for performing speech transmission and may select, as a speech reception device, a device suitable for speech reception, from among the external electronic device 310 and the electronic device 400. The processor 450 may select, as a speech transmission device, only one of the electronic device 400 and the external electronic device 310, and may select, as a speech reception device, only one of the electronic device 400 and the external electronic device 310. For example, if both devices are selected as speech transmission devices, duplication between speech signals acquired by respective devices, an echo phenomenon, and the like may occur, and selecting only one device may be appropriate for a call connection. Similarly, even in a case of a speech reception device, selecting only one of respective devices as a speech reception device may be appropriate for a call connection in order to prevent duplication between speech signals output by the respective devices, an echo phenomenon, and the like.

The processor 450 may determine a device suitable for speech transmission by comparing a speech signal received in the electronic device 400 with a speech signal received in the external electronic device 310. For example, the processor 450 may calculate a signal-to-noise ratio (SNR) value, based on a speech signal acquired by an audio module (e.g., audio module 430 of FIG. 4) of the electronic device 400. The processor 450 may receive, from the external electronic device 310, a speech signal acquired by the external electronic device 310 having a microphone and may calculate an SNR value on the basis of the received speech signal. The processor 450 may select a device suitable for speech transmission, by comparing SNR values of respective speech signals acquired from the electronic device 400 and the external electronic device 310. The processor 450 may calculate speech-to-echo ratio (SER) values of the speech signals acquired by the electronic device 400 and the external electronic device 310, respectively, and may select a speech transmission device by comparing the respective SER values. The processor 450 may determine a device having a larger identified SNR or SER value, as a device more suitable for speech transmission. The processor 450 may measure, using sensing information acquired from a sensor module (e.g., sensor module 420 of FIG. 4), a distance between a user (e.g., user 350 of FIG. 3) and the electronic device 400 and a distance between the external electronic device 310 and the electronic device 400. The processor 450 may measure, based on the distance from the electronic device 400 to the external electronic device 310 and the distance from the electronic device 400 to a user (e.g., user 350 of FIG. 3), the distance between the external electronic device 310 and the user 350. The processor 450 may select, as a speech transmission device, a closer device among the external electronic device 310 and the electronic device 400, based on information of the distances between the electronic device 400, the user 350, and the external electronic device 310, respectively. The processor 450 may determine a microphone reception sensitivity of each device based on device information of the electronic device 400 or information on the audio module 430, which is stored in the memory 440, and device information of the external electronic device 310, which is received from the external electronic device 310, and may select a speech transmission device on the basis of information on the microphone reception sensitivity. The processor 450 may estimate an SNR value or an SER value, based on the microphone reception sensitivity and the distance of the electronic device 400 or external electronic device 310. Information on an estimation value of an SNR or SER value based on a predetermined distance and reception sensitivity may be previously stored in the memory 440. According to an embodiment, the processor 450 may select a speech transmission device, based on any one of or a combination of information relating to the distance of the external electronic device 310 and the electronic device 400 and/or information relating to sound (e.g., SNR value or SER value), and device information on each device. The processor 450 may identify a user's location, motion, gesture, or environment information (e.g., temperature, humidity, or space information) on the basis of sensing information acquired from the sensor module 420 and may select a speech transmission device on the basis of the user's location, motion, gesture, or environment information identified based on the sensing information.

The processor 450 may determine a device suitable for speech reception by comparing a speech signal output from the electronic device 400 with a speech signal output from the external electronic device 310. For example, the processor 450 may calculate a signal-to-noise ratio (SNR) value, based on a speech signal output from the audio module 430 of the electronic device 400. The processor 450 may identify information (e.g., information relating to a range of volume that can be output) on speech signal output ranges of respective devices and may identify sound information (e.g., SNR value) for speech signals output by the respective device, based on device information of the electronic device 400 or information on the audio module 430, which is stored in the memory 440, and device information of the external electronic device 310, which is received from the external electronic device 310. The processor 450 may estimate an SNR value or an SER value, based on information of the speech signal output range and the distance of the electronic device 400 or external electronic device 310. Information on an estimation value of an SNR value based on a predetermined distance and speech output range may be previously stored in the memory 440. The processor 450 may determine a device having a larger SNR value, as a device more suitable for speech reception. The processor 450 may measure, using sensing information acquired from the sensor module 420, a distance between a user (e.g., user 350 of FIG. 3) and the electronic device 400 and a distance between the external electronic device 310 and the electronic device 400. The processor 450 may measure the distance between the external electronic device 310 and the user 350, based on the distance from the electronic device 400 to the external electronic device 310 and the distance from the electronic device 400 to the user 350. The processor 450 may select, as a speech reception device, a closer device among the external electronic device 310 and the electronic device 400, based on information of the distances between the electronic device 400, the user 350, and the external electronic device 310, respectively. The processor 450 may select a speech reception device, based on any one of or a combination of information relating to the distance of the external electronic device 310 and the electronic device 400 and/or information relating to sound (e.g., SNR value or SER value), and device information on each device. The processor 450 may identify a user's location, motion, gesture, or environment information (e.g., temperature, humidity, or space information) on the basis of sensing information acquired from the sensor module 420 and may select a speech reception device on the basis of the user's location, motion, gesture, or environment information identified based on the sensing information.

The processor 450 may control a speech input interface and/or speech output interface of a speech transmission device and/or speech reception device. When the processor 450 selects each of a speech reception device and a speech transmission device from among the electronic device 400 and the external electronic device 310, the speech transmission device and the speech reception device may be the same electronic device but may be different electronic devices. If the speech transmission device and speech reception device selected from among the electronic device 400 and the external electronic device 310 are different from each other, the processor 450 may control to enable only a speech input interface (e.g., microphone) of the speech transmission device and to disable a speech input interface of the speech reception device. The processor 450 may control to enable only a speech output interface (e.g., speaker) of the speech reception device and to disable a speech output interface of the speech transmission device. If there are multiple external electronic devices 310, the processor 450 may control to enable only a speech output interface provided in one device selected as a speech reception device and to disable speech output interfaces of all the other devices and may control to enable only a speech input interface provided in one device selected as a speech transmission device and to disable speech input interfaces of all the other devices, from among the electronic device 400 and the multiple external electronic devices 310. If the same device is selected as a speech transmission device and a speech reception device, the processor 450 may control to enable only a speech input interface and a speech output interface of a device selected as the speech transmission device and speech reception device, and to disable speech input interfaces and speech output interfaces of all the other devices. According to an embodiment, the processor 450 may transmit, to the connected external electronic device 310, a signal or command for controlling of speech input/output of a speech interface (e.g., microphone or speaker) of the external electronic device 310.

In operation 530, the processor 450 may acquire and store an echo reference signal. The echo reference signal may be a signal to be output by the speech reception device. For example, the echo reference signal may be reception speech. The echo reference signal may be a signal obtained by pre-processing (e.g., scaling) the reception speech. The processor 450 may receive the echo reference signal from the external electronic device 310. If the external electronic device 310 is selected as the speech reception device, the processor 450 may receive a signal related to a counterpart speech from a counterpart terminal (e.g., counterpart terminal 330 of FIG. 3) and may transmit the signal to the external electronic device 310, and the external electronic device 310 may pre-process the received signal related to the counterpart speech in order to output reception speech by using a provided speaker. For example, the processor 450 may receive, as the echo reference signal from the external electronic device 310, a signal that the external electronic device 310 has processed to output reception speech. The processor 450 may acquire, as the echo reference signal, a signal related to the counterpart speech received from the counterpart terminal 330 or a signal obtained by pre-processing the signal. The processor 450 may store the acquired echo reference signal in a memory (e.g., memory 440 of FIG. 4). According to an embodiment, the processor 450 may update and store the acquired echo reference signal in a buffer (e.g., buffer 441 of FIG. 4).

In operation 540, the processor 450 may determine an EPD value. According to an embodiment, the processor 450 may determine, as the EPD value, an initial EPD value stored in the memory 440. The memory 440 may store a preconfigured EPD value, or may estimate an EPD value when connected to the external electronic device 310. The processor 450 may store an estimated EPD value in the memory 440 and may identify an existing estimated EPD value stored in the memory 440 when connected to the external electronic device 310. The processor 450 may estimate an EPD value. The processor 450 may store an echo reference signal in the buffer 441 and may continuously update an adaptive filter by applying the EPD value. The processor 450 may determine whether the EPD value needs to be changed. If the echo reference signal is input beyond a processing range (e.g., length) of the adaptive filter, that is, if the EPD exceeds the processing range of the adaptive filter, the processor 450 may determine that the EPD needs to be changed. If echo cancellation is not performed by a specific threshold value or greater (e.g., if an echo signal is detected to have a magnitude equal to or greater than the specific threshold value), the processor 450 may determine that the EPD needs to be changed.

The processor 450 may continuously update the echo reference signal in the buffer by applying the configured EPD value. The processor 450 may increase or decrease a predetermined time interval in the existing EPD value and may apply the EPD value to the echo reference. The processor 450 may apply, to the echo reference signal, respective time values obtained by increasing and decreasing the predetermined time interval in the existing EPD value, and may calculate respective coefficients of correlations between transmission speech and the echo reference signals, to which the respective time values have been applied. The time value to increase or decrease the existing EPD value may be a value greater than the length of the adaptive filter. The time value for an increase or a decrease may be a multiple of the length of the adaptive filter. The processor 450 may, based on comparison of the calculated correlation coefficient values, change the EPD in a direction having a largest correlation coefficient, store the changed EPD as an estimated EPD, and shift the echo reference signal within buffer 441. If all of the calculated correlation coefficient values are smaller than a threshold value, the processor 450 may change the time value to increase or decrease the EPD. For example, there may be a need to search a wider range in the existing EPD value. If the calculated correlation coefficient values are smaller than a predetermined range, the processor 450 may repeat the same estimation by applying a time value (e.g., second time value) larger than a first applied time value (e.g., first time value). The processor 450 may estimate (e.g., first estimation) the EPD value by using a time value greater than the length of the adaptive filter, and then may perform precise estimation (e.g., second estimation) using a small time value. The second estimation may be performed, for example, by applying a time value (e.g., third time value) smaller than the length of the adaptive filter. The processor 450 may estimate the EPD value and may identify the estimated EPD value.

In operation 550, the processor 450 may cancel an echo signal. According to various embodiments, the processor 450 may determine the EPD value and may apply the determined EPD value to an echo reference signal. The processor 450 may cancel the echo by applying the EPD value to the echo reference signal, inputting the same to the adaptive filter, and adding or subtracting an output value of the adaptive filter to or from transmission speech. The output of the adaptive filter may be updated based on a least mean square (LMS), normalized least mean square (NLMS), or root mean square (RMS) algorithm. The processor 450 may transmit the transmission speech, in which an echo is canceled, to a counterpart terminal (e.g., counterpart terminal 330 of FIG. 3).

Figure 6:
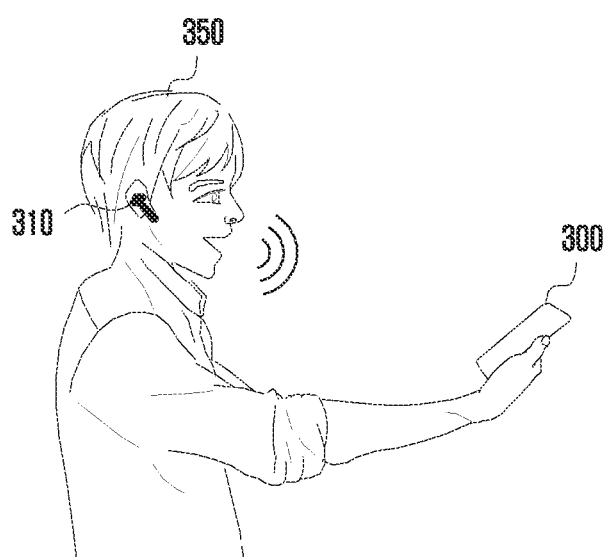
FIG. 6 is a diagram illustrating an operation of controlling a speech transmission device and a speech reception device when an electronic device is connected to a wearable device according to an embodiment of the disclosure.

FIG. 6 is a diagram illustrating an operation of controlling a speech transmission device and a speech reception device when an electronic device is connected to a wearable device according to an embodiment of the disclosure.

Referring to FIG. 6, the electronic device 300 (e.g., electronic device 300 of FIG. 3) may control speech transmission and speech reception during a call connection in an environment where a connection is made to the external electronic device 310. In the embodiment shown in FIG. 6, the external electronic device 310 may be a wearable device (e.g., wireless earphone). There is no limitation in the form, function, and type of the external electronic device 310, but in FIG. 6, the external electronic device 310 will be described based on a wearable device (e.g., wireless earphone). When the electronic device 300 is connected to the external electronic device 310, a speech transmission device or a speech reception device may be selected from among the electronic device 300 and the external electronic device 310.

If a call connection is performed when the external electronic device 310 is connected, the electronic device 300 may control a speech transmission device and a speech reception device. The speech transmission device may refer to a device suitable for speech transmission among the electronic device 300 and the external electronic device 310 connected to the electronic device 300. The electronic device 300 may select a speech transmission device, based on sensing information acquired from a sensor included in the electronic device 300, state information of a speech input interface (e.g., microphone) provided in each of the electronic device 300 and the external electronic device 310, and analysis information for an audio signal of transmission speech received by each of the electronic device 300 and the external electronic device 310. Analysis of the audio signal may include, for example, calculating a signal-to-noise ratio (SNR) value, calculating a speech-to-echo ratio (SER) value, or comparing the calculated SNR or SER value.

The speech reception device may refer to a device suitable for speech reception among the electronic device 300 and the external electronic device 310 connected to the electronic device 300. The electronic device 300 may compare the electronic device 300 with the external electronic device 310 and may select a speech reception device, by using sensing information acquired by the electronic device 300 or information obtained by estimating speech that the user 350 can hear from the electronic device 300 or the external electronic device 310. The electronic device 300 may select a speech transmission device and/or a speech reception device, based on various data, such as the user's behavior, location, state information of the electronic device 300 and/or the external electronic device 310, and hardware information of the electronic device 300 or the external electronic device 310. Referring to FIG. 6, a speech transmission device (e.g., a device suitable for speech transmission), may be the electronic device 300. For example, when a call is connected, the electronic device 300 may be located in a speech direction of the user 350 so as to receive a signal having a larger SNR value or SER value than that of the external electronic device 310. Referring to FIG. 6, a speech reception device may be the external electronic device 310. When a call is connected, the external electronic device 310 may be mounted on the ear of the user 350 and may be more suitable for listening to reception speech. For example, the external electronic device 310 may be equipped with an active noise-cancellation (ANC) function. The electronic device 300 may select a speech reception device, based on data, such as hardware information or software information of the external electronic device 310.

In the embodiment shown in FIG. 6, the user 350 may perform a call connection based on a video call using the electronic device 300. When the external electronic device 310 is connected, if the external electronic device 310 is determined to be suitable for speech reception, the electronic device 300 may select the external electronic device 310 as a speech reception device and may select the electronic device 300 as a speech transmission device. In this case, the electronic device 300 may receive an audio signal relating to a counterpart speech from a counterpart terminal (e.g., counterpart terminal 330 of FIG. 3), and may transmit the audio signal for the counterpart speech to the connected external electronic device 310. The electronic device 300 may control to enable only a speech output interface of the external electronic device 310 and to disable a speech input interface of the external electronic device 310 so as to allow only the external electronic device 310 to output reception speech. If the electronic device 300 is selected as a speech transmission device, only a speech input interface of the electronic device 300 may be enabled, and a speech output interface of the electronic device 300 may be disabled so as to receive reception speech related to speech of the user 350.

The electronic device 300 may process a signal for the received reception speech so as to transmit the processed signal to the counterpart terminal 330.

Figure 7:
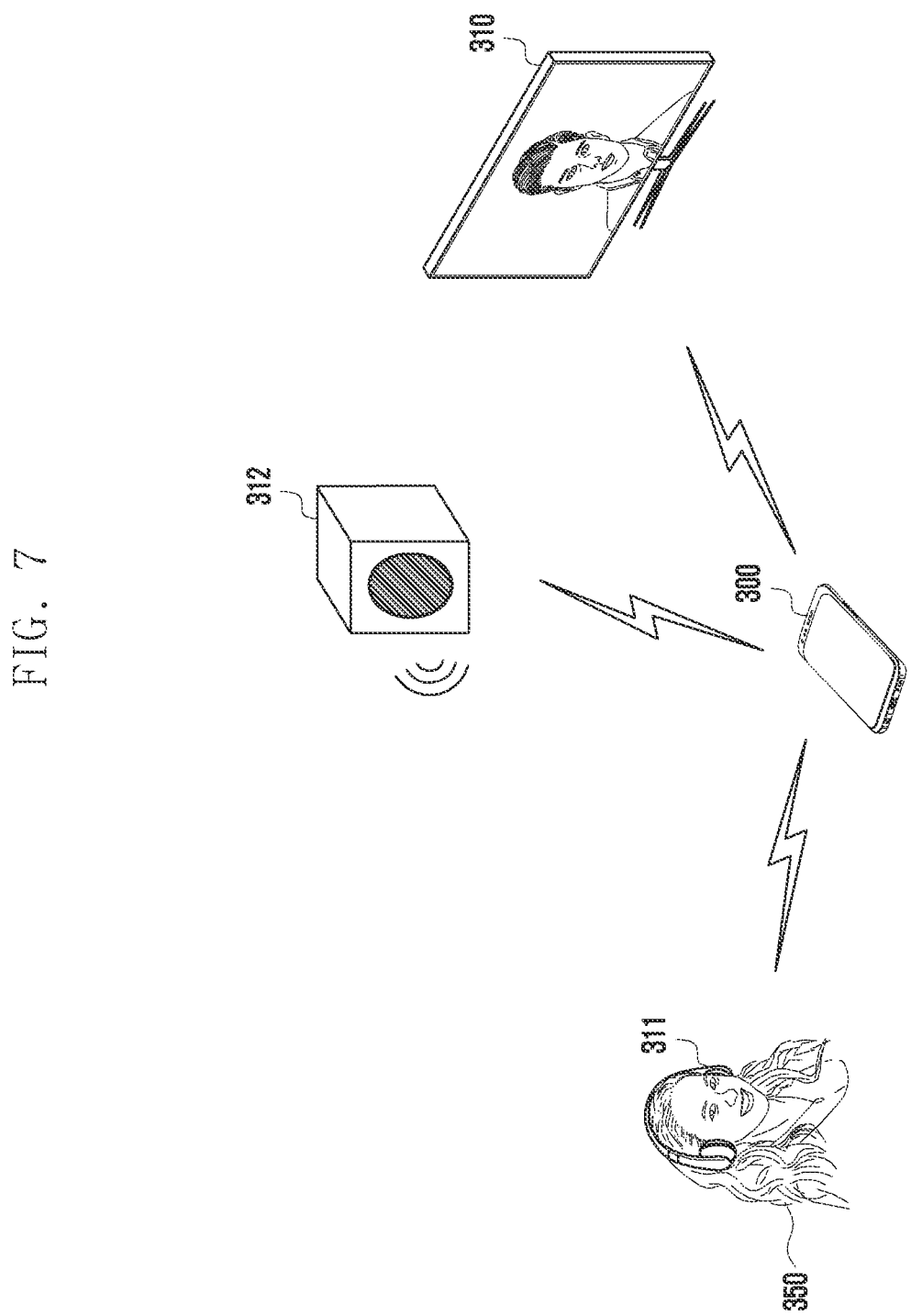
FIG. 7 is a diagram illustrating an operation of controlling a speech transmission device and a speech reception device when an electronic device is connected to multiple external electronic devices according to an embodiment of the disclosure.

FIG. 7 is a diagram illustrating an operation of controlling a speech transmission device and a speech reception device when an electronic device is connected to multiple external electronic devices according to an embodiment of the disclosure.

Referring to FIG. 7, there may be multiple external electronic devices connected to the electronic device 300. For example, the electronic device 300 may be concurrently connected to the first external electronic device 310, a second external electronic device 311, and a third external electronic device 312. If a call connection is performed when the electronic device 300 is connected to the first external electronic device 310, the second external electronic device 311, and the third external electronic device 312, the electronic device 300 may control a speech transmission device and a speech reception device. The speech transmission device may refer to a device suitable for speech transmission among the electronic device 300 and external electronic devices (e.g., first external electronic device 310, second external electronic device 311, and third external electronic device 312) connected to the electronic device 300. The electronic device 300 may select a speech transmission device, based on sensing information acquired from a sensor included in the electronic device 300, state information of a speech input interface (e.g., microphone) included in each of the electronic device 300 and external electronic devices (e.g., first external electronic device 310, second external electronic device 311, and third external electronic device 312), and analysis information on an audio signal of transmission speech received by each of the electronic device 300 and the multiple external electronic devices. Analysis of the audio signal may include calculating a signal-to-noise ratio (SNR) value, calculating a speech-to-echo ratio (SER) value, or comparing the calculated SNR or SER value. The speech reception device may refer to a device suitable for speech reception among the electronic device 300 and external electronic devices connected to the electronic device 300. The electronic device 300 may compare the electronic device 300 with external electronic devices (e.g., first external electronic device 310, second external electronic device 311, and third external electronic device 312) and select a speech reception device, by using sensing information acquired by the electronic device 300 and information obtained by estimating speech audible by the user 350 from the electronic device 300 or the external electronic devices. The electronic device 300 may select a speech transmission device and/or a speech reception device, based on various data, such as the user's behavior, location, state information of the electronic device 300 and/or the external electronic devices and hardware information of the electronic device 300 and/or the external electronic devices.

When a speech reception device and a speech transmission device are selected from among the electronic device 300 and the multiple connected external electronic devices (e.g., first external electronic device 310, second external electronic device 311, and third external electronic device 312), the electronic device 300 may enable a speech input interface of the selected speech transmission device and may disable a speech output interface of the speech transmission device. The electronic device 300 may enable a speech output interface of the selected speech reception device and may disable a speech input interface of the speech reception device. If there are multiple connected external electronic devices, the electronic device 300 may control to disable both a speech input interface and a speech output interface of an external electronic device that is not selected as a speech transmission device or speech reception device. If one of the multiple external electronic devices other than the electronic device 300 is selected as a speech reception device, and one of the other external electronic devices is selected as a speech transmission device, the electronic device 300 may disable a speech interface (e.g., microphone 431 and speaker 432 of FIG. 4) included in the electronic device 300. For example, the electronic device 300 may transmit speech information received from a counterpart terminal (e.g., counterpart terminal 330 of FIG. 3) to the external electronic device (e.g., first external electronic device 310, second external electronic device 311, or third external electronic device 312) selected as the speech reception device, and may receive transmission speech from the external electronic device (e.g., first external electronic device 310, second external electronic device 311, or third external electronic device 312) selected as the speech transmission device.

The electronic device 300 may cancel an echo that may occur in the speech transmission device. An echo may occur when the speech transmission device receives transmission speech. For example, reception speech output by the speech reception device may be input to the speech transmission device and may act as an echo. The electronic device 300 may be connected to a variety of external electronic devices (e.g., first external electronic device 310, second external electronic device 311, and third external electronic device 312), and a speech transmission device or a speech reception device selected from the external electronic devices may be different from each other, and thus a value relating to a characteristic (e.g., echo path delay (EPD)) of an echo may also vary. The electronic device 300 may adaptively cancel echoes having various characteristics.

The electronic device 300 may acquire an echo reference signal and may store the acquired echo reference signal. The echo reference signal may be a signal to be output by the speech reception device. For example, the echo reference signal may be reception speech. The echo reference signal may be a signal obtained by pre-processing (e.g., scaling) the reception speech. The electronic device 300 may receive an echo reference signal from an external electronic device (e.g., first external electronic device 310, second external electronic device 311, or third external electronic device 312) selected as a speech reception device. If an external electronic device (e.g., first external electronic device 310, second external electronic device 311, or third external electronic device 312) is selected as a speech reception device, the electronic device 300 may receive a signal related to a counterpart speech from a counterpart terminal (e.g., counterpart terminal 330 of FIG. 3) so as to transmit the signal to the speech reception device, and the speech reception device may pre-process the received signal related to the counterpart speech so as to output reception speech by using a provided speaker. For example, the electronic device 300 may receive, as an echo reference signal from the external electronic device, a signal that the external electronic device 310 has processed to output reception speech. The electronic device 300 may acquire, as an echo reference signal, the signal related to the counterpart speech received from the counterpart terminal 330 or a signal obtained by pre-processing the signal.

The electronic device 300 may determine an echo path delay (EPD) value of an echo included in transmission speech. An EPD value may be a difference between an arrival time of an echo reference signal, which is received from the speech reception device, to the electronic device 300 and a time at which the speech signal output from the speech reception device is acquired by the speech transmission device and arrives at the electronic device 300. An audio signal may be transferred through a different path for each device, and a slight difference in arrival time may occur. An EPD value may have a specific correlation with the distance of a speech transmission device and speech reception device. For example, an EPD value may have a positive correlation with a distance between a speech transmission device and a speech reception device. Alternatively, an EPD value may be related to a speed at which a speech reception device processes and outputs reception speech. The EPD value may vary according to various variables, such as distances, states, configuration environments, and surrounding environments (e.g., surrounding structure) of a speech transmission device and a speech reception device. The electronic device 300 may determine the EPD value and may apply the determined EPD value to the echo reference signal. The electronic device 300 may cancel the echo by applying the EPD value to the echo reference signal, inputting the echo reference signal to the adaptive filter, and adding or subtracting an output value of the adaptive filter to or from transmission speech. The output of the adaptive filter may be updated based on a least mean square (LMS), normalized least mean square (NLMS), or root mean square (RMS) algorithm.

When a speech reception device and a speech transmission device are selected from among the electronic device 300 and the connected external electronic device (e.g., first external electronic device 310, second external electronic device 311, or third external electronic device 312), the electronic device 300 may enable a speech input interface of the speech transmission device and may disable a speech output interface of the speech transmission device. The electronic device 300 may enable a speech output interface of the selected speech reception device and may disable a speech input interface of the speech reception device. If there are multiple connected external electronic devices, the electronic device 300 may control to disable both a speech input interface and a speech output interface of an external electronic device that is not selected as a speech transmission device or speech reception device.

Figure 8:
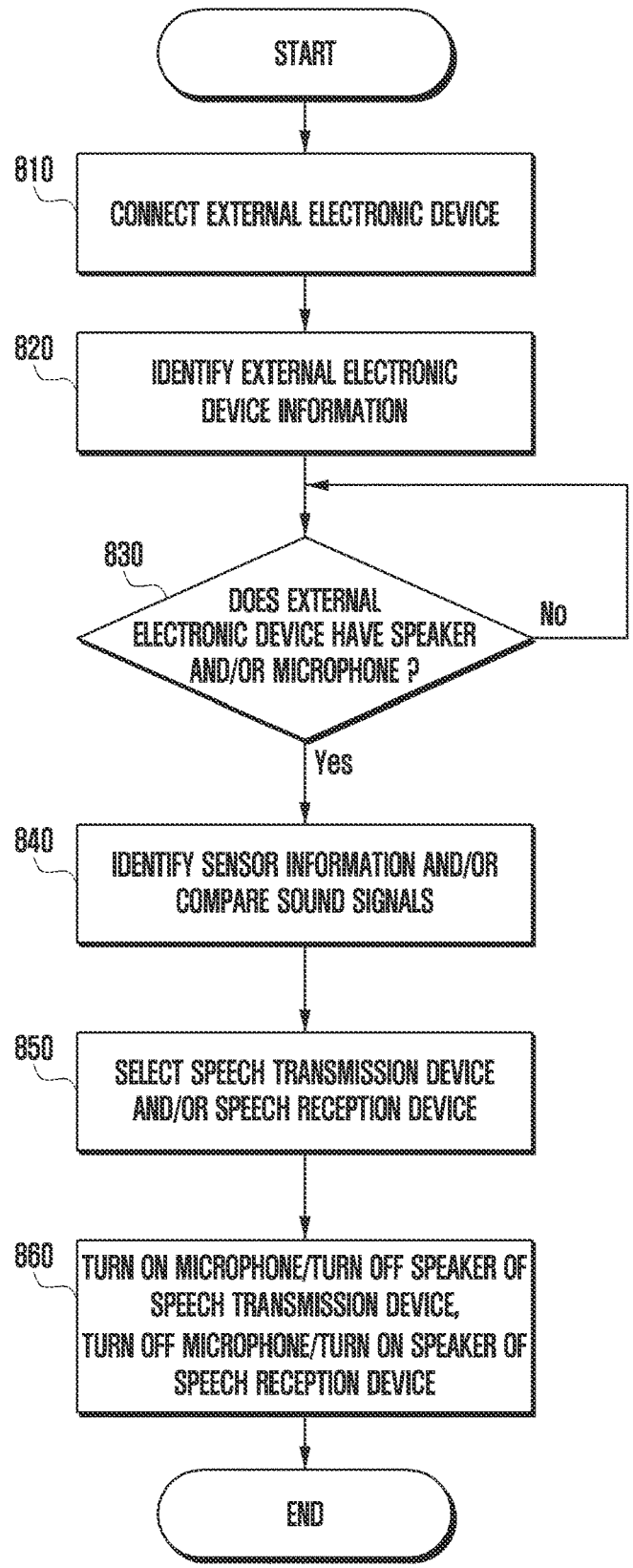
FIG. 8 is a flowchart for an operation of selecting a speech transmission device and a speech reception device when an electronic device is connected to an external electronic device according to an embodiment of the disclosure.

FIG. 8 is a flowchart for an operation of selecting a speech transmission device and a speech reception device when an electronic device is connected to an external electronic device according to an embodiment of the disclosure.

Referring to FIG. 8, operations in which an electronic device (e.g., electronic device 400 of FIG. 4) selects a speech transmission device and a speech reception device when connected to an external electronic device may be described as respective operations of a processor (e.g., processor 450 of FIG. 4) included in the electronic device 400.

In operation 810, the processor 450 may be connected to an external electronic device. According to various embodiments, the processor 450 may be communicatively connected (communication connection) with an external electronic device (e.g., external electronic device 310 of FIG. 3) by using a communication module (e.g., communication module 410 of FIG. 4). According to various embodiments, the processor 450 may be connected to the external electronic device 310 by using short-range wireless communication, such as Bluetooth, Bluetooth low energy (BLE), and Wi-Fi. For example, the external electronic device 310 may be an electronic device existing within a short distance from a user (e.g., user 350 of FIG. 3) and/or an electronic device (e.g., electronic device 300 of FIG. 3). The external electronic device 310 may have a built-in communication module for performing wireless communication with the processor 450. The external electronic device 310 may be an electronic device having a speech output interface (e.g., speaker) or a speech input interface (e.g., microphone). According to various embodiments, the processor 450 may be connected to the external electronic device 310 by using short-range wireless communication so as to control an operation of the external electronic device 310 and may receive data from the external electronic device 310 or may transmit, to the external electronic device 310, various types of information including data for controlling of the external electronic device. For example, the processor 450 may transmit a certain audio signal to the external electronic device 310 and may control the external electronic device 310 to output the audio signal received from the processor 450. As another example, the processor 450 may receive, from the external electronic device 310, an audio signal related to speech information input to the external electronic device 310.

In operations 820 and 830, the processor 450 may identify device information of the external electronic device 310 in operation 820, and may determine whether the external electronic device 310 includes a speaker and/or a microphone in operation 830. The processor 450 may determine whether an external electronic device (e.g., external electronic device 310 of FIG. 3) includes a speaker and/or a microphone. When connection to the external electronic device 310 is performed, the processor 450 may receive information related to the external electronic device 310, such as device information, hardware information, and/or software information of the external electronic device 310. The processor 450 may determine whether the connected external electronic device 310 includes an interface (e.g. microphone) through which speech may be input, based on the information related to the external electronic device 310. The processor 450 may determine whether the external electronic device 310 has an interface (e.g., speaker) capable of outputting speech. When information on whether the external electronic device 310 includes a microphone and/or a speaker is required, the processor 450 may identify the information. For example, when a call connection request is received from a counterpart terminal (e.g., counterpart terminal 330 of FIG. 3) or is received from a user, or as soon as the external electronic device 310 is connected, the processor 450 may determine whether the external electronic device 310 includes a microphone and/or a speaker.

If an external electronic device (e.g., external electronic device 310 of FIG. 3) includes a speaker and/or a microphone, the processor 450 may perform operation 840. If an external electronic device (e.g., external electronic device 310 of FIG. 3) does not include a speaker and/or a microphone, the processor 450 may repeatedly perform operation 830.

According to an embodiment of the disclosure (not shown), if an external electronic device (e.g., external electronic device 310 of FIG. 3) does not include a speaker and/or a microphone, the processor 450 may determine whether a communication connection (e.g., first network 198 or second network 199 of FIG. 1) has been made to another external electronic device (e.g., electronic device 102 or electronic device 104 of FIG. 1). For example, if a communication connection is made to another external electronic device other than the external electronic device, the processor 450 may determine whether the other external electronic device includes a speech interface (e.g., speaker and/or mic (microphone)). If the other external electronic device includes a speech interface (e.g., speaker and/or mic (microphone)), operations 840 to 860 may be performed based on the electronic device 400 and the other external electronic device.

In operations 840 and 850, the processor 450 may select a speech transmission device and/or a speech reception device. If the external electronic device 310 includes a microphone and/or a speaker, the processor 450 may select, as a speech transmission device, a device suitable for performing speech transmission and may select, as a speech reception device, a device suitable for speech reception, from among the external electronic device 310 and the electronic device 400. The processor 450 may select, as a speech transmission device, only one of the electronic device 400 and the external electronic device 310, and may select, as a speech reception device, only one of the electronic device 400 and the external electronic device 310. For example, if both devices are selected as speech transmission devices, duplication between speech signals acquired by respective devices, an echo phenomenon, and the like may occur, and selecting only one device may be appropriate for a call connection. Similarly, even in a case of a speech reception device, selecting only one of respective devices as a speech reception device may be appropriate for a call connection in order to prevent duplication between speech signals output by the respective devices, an echo phenomenon, and the like.

In operations 840 and 850, the processor 450 may identify sensor information and/or compare sound signals. The processor 450 may determine a device suitable for speech transmission by comparing a speech signal received in the electronic device 400 with a speech signal received in the external electronic device 310. For example, the processor 450 may calculate a signal-to-noise ratio (SNR) value, based on a speech signal acquired from the audio module 430 of the electronic device 400. The processor 450 may receive, from the external electronic device 310, a speech signal acquired by the external electronic device 310 having a microphone and may calculate an SNR value on the basis of the received speech signal. The processor 450 may select a device suitable for speech transmission, by comparing SNR values of respective speech signals acquired from the electronic device 400 and the external electronic device 310. The processor 450 may calculate speech-to-echo ratio (SER) values of the speech signals acquired by the electronic device 400 and the external electronic device 310, respectively, and may select a speech transmission device by comparing the respective SER values. The processor 450 may determine a device having a larger identified SNR or SER value, as a device more suitable for speech transmission. The processor 450 may measure, using sensing information acquired from the sensor module 420, a distance between a user (e.g., user 350 of FIG. 3) and the electronic device 400 and a distance between the external electronic device 310 and the electronic device 400. The processor 450 may measure the distance between the external electronic device 310 and the user 350, based on the distance from the electronic device 400 to the external electronic device 310 and the distance from the electronic device 400 to the user 350. The processor 450 may select, as a speech transmission device, a closer device among the external electronic device 310 and the electronic device 400, based on information of the distances between the electronic device 400, the user 350, and the external electronic device 310, respectively. The processor 450 may determine a microphone reception sensitivity of each device on the basis of device information of the electronic device 400 or information on the audio module 430, which is stored in the memory 440, and device information of the external electronic device 310, which is received from the external electronic device 310, and may select a speech transmission device on the basis of information on the microphone reception sensitivity. The processor 450 may estimate an SNR value or an SER value, based on the microphone reception sensitivity and the distance of the electronic device 400 or external electronic device 310. Information on an estimation value of an SNR or SER value based on a predetermined distance and reception sensitivity may be previously stored in the memory 440. The processor 450 may select a speech transmission device, based on any one of or a combination of at least some of information relating to the distance of the external electronic device 310 and the electronic device 400 and/or information relating to sound (e.g., SNR value or SER value), and device information on each device. The processor 450 may identify a user's location, motion, gesture, or environment information (e.g., temperature, humidity, or space information) on the basis of sensing information acquired from the sensor module 420 and may select a speech transmission device on the basis of the user's location, motion, gesture, or environment information identified based on the sensing information.

In operations 840 and 850, the processor 450 may determine a device suitable for speech reception by comparing a speech signal output from the electronic device 400 with a speech signal output from the external electronic device 310. For example, the processor 450 may calculate a signal-to-noise ratio (SNR) value, based on a speech signal output from the audio module 430 of the electronic device 400. The processor 450 may identify information (e.g., information relating to a range of volume that can be output) on speech signal output ranges of respective devices and may identify sound information (e.g., SNR value) for speech signals output by the respective device, based on device information of the electronic device 400 or information on the audio module 430, which is stored in the memory 440, and device information of the external electronic device 310, which is received from the external electronic device 310. The processor 450 may estimate an SNR value or an SER value, based on information of the speech signal output range and the distance of the electronic device 400 or external electronic device 310. Information on an estimation value of an SNR value based on a predetermined distance and speech output range may be previously stored in the memory 440.

The processor 450 may determine a device having a larger SNR value, as a device more suitable for speech reception. The processor 450 may measure, using sensing information acquired from the sensor module 420, a distance between a user (e.g., user 350 of FIG. 3) and the electronic device 400 and a distance between the external electronic device 310 and the electronic device 400. The processor 450 may measure the distance between the external electronic device 310 and the user 350, based on the distance from the electronic device 400 to the external electronic device 310 and the distance from the electronic device 400 to the user 350. The processor 450 may select, as a speech reception device, a closer device among the external electronic device 310 and the electronic device 400, based on information of the distances between the electronic device 400, the user 350, and the external electronic device 310, respectively. The processor 450 may select a speech reception device, based on any one of or a combination of at least some of information relating to the distance of the external electronic device 310 and the electronic device 400 and/or information relating to sound (e.g., SNR value or SER value), and device information on each device. The processor 450 may identify a user's location, motion, gesture, or environment information (e.g., temperature, humidity, or space information) based on sensing information acquired from the sensor module 420 and may select a speech reception device on the basis of the user's location, motion, gesture, or environment information identified based on the sensing information.

In operation 860, the processor 450 may control a speech input interface and/or speech output interface of a speech transmission device and/or speech reception device. When the processor 450 selects each of a speech reception device and a speech transmission device from among the electronic device 400 and the external electronic device 310, the speech transmission device and the speech reception device may be the same electronic device but may be different electronic devices. If the speech transmission device and speech reception device selected from among the electronic device 400 and the external electronic device 310 are different from each other, the processor 450 may control to enable only a speech input interface (e.g., microphone) of the speech transmission device and to disable a speech input interface of the speech reception device. The processor 450 may control to enable only a speech output interface (e.g., speaker) of the speech reception device and to disable a speech output interface of the speech transmission device. If there are multiple external electronic devices 310, the processor 450 may control to enable only a speech output interface provided in one device selected as a speech reception device and to disable speech output interfaces of all the other devices and may control to enable only a speech input interface provided in one device selected as a speech transmission device and to disable speech input interfaces of all the other devices, from among the electronic device 400 and the multiple external electronic devices 310. If the same device is selected as a speech transmission device and a speech reception device, the processor 450 may control to enable only a speech input interface and a speech output interface of a device selected as the speech transmission device and speech reception device, and to disable speech input interfaces and speech output interfaces of all the other devices. The processor 450 may transmit, to the connected external electronic device 310, a signal or command for controlling of speech input/output of a speech interface (e.g., microphone or speaker) of the external electronic device 310. A speech transmission device and a speech reception device selected by the processor 450 may be the same device, or the electronic device 400 and all other external electronic devices 310 including a speech interface (e.g., microphone or speaker), which are connected to the electronic device 400, may be selected as a speech transmission device and/or a speech reception device.

Figure 9:
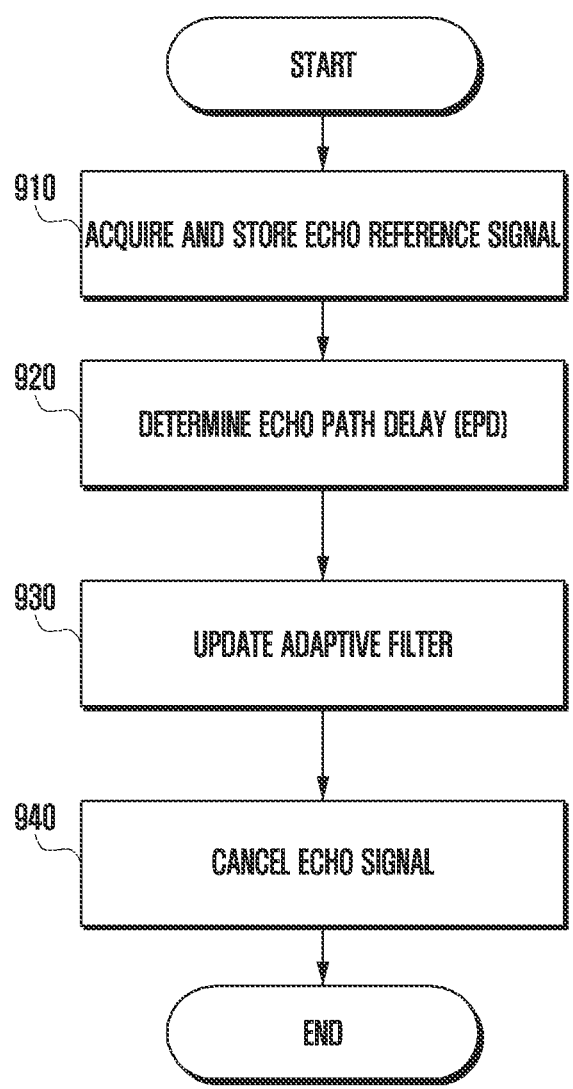
FIG. 9 is a flowchart for an operation of canceling an echo by an electronic device according to an embodiment of the disclosure.

FIG. 9 is a flowchart for an operation of canceling an echo by an electronic device according to an embodiment of the disclosure.

Referring to FIG. 9, an operation in which an electronic device (e.g., electronic device 400 of FIG. 4) cancels an echo may be described as respective operations of a processor (e.g., processor 450 of FIG. 4) included in the electronic device 400.

In operation 910, the processor 450 may acquire an echo reference signal and may store the acquired echo reference signal. The echo reference signal may be a signal to be output by the speech reception device. For example, the echo reference signal may be reception speech. The echo reference signal may be a signal obtained by pre-processing (e.g., scaling) the reception speech. The processor 450 may receive the echo reference signal from the external electronic device 310. If the external electronic device 310 is selected as a speech reception device, the processor 450 may receive a signal related to a counterpart speech from a counterpart terminal (e.g., counterpart terminal 330 of FIG. 3) and may transmit the signal to the external electronic device 310, and the external electronic device 310 may pre-process the received signal related to the counterpart speech in order to output reception speech by using a provided speaker. For example, the processor 450 may receive, as the echo reference signal from the external electronic device 310, the signal that the external electronic device 310 has processed to output reception speech. The processor 450 may acquire, as the echo reference signal, the signal related to the counterpart speech received from the counterpart terminal (e.g., counterpart terminal 330 of FIG. 3) or the signal obtained by pre-processing the acquired signal. The processor 450 may store the acquired echo reference signal in a memory (e.g., memory 440 of FIG. 4). The processor 450 may update and store the acquired echo reference signal in a buffer (e.g., buffer 441 of FIG. 4).

In operation 920, the processor 450 may determine an echo path delay (EPD) value of an echo included in transmission speech. An EPD value may be, for example, a difference between an arrival time of an echo reference signal, which is received from a speech reception device, to the processor 450 and a time at which a speech signal output from the speech reception device is acquired by a speech transmission device and arrives at the processor 450. An audio signal may be transferred through a different path for each device, and a slight difference in arrival time may occur. An EPD value may have a specific correlation with the distance of a speech transmission device and speech reception device. For example, the EPD value may have a positive correlation with the distance of a speech transmission device and speech reception device. Alternatively, the EPD value may be related to a speed at which a speech reception device processes and outputs reception speech. The EPD value may vary according to various variables, such as distances, states, configuration environments, and surrounding environments (e.g., surrounding structure) of a speech transmission device and a speech reception device. The processor 450 may determine an EPD value and may apply the determined EPD value to an echo reference signal. The processor 450 may cancel the echo by applying the EPD value to the echo reference signal, inputting the same to the adaptive filter, and adding or subtracting an output value of an adaptive filter to or from transmission speech. For the adaptive filter, the EPD value may not be applied, and a predefined table value may be applied in order to improve an operation speed. The predefined table value may be stored in, for example, the memory 440.

In operation 930, the processor 450 may update the adaptive filter. The processor 450 may update the adaptive filter, based on transmission speech and a signal in which the echo reference signal is delayed by the determined EPD value. The output of the adaptive filter may be updated based on a least mean square (LMS), normalized least mean square (NLMS), or root mean square (RMS) algorithm.

In operation 940, the processor 450 may cancel an echo by using an output value of the adaptive filter. The processor 450 may cancel an echo by applying the EPD value to the echo reference signal, inputting the same to an adaptive filter, and adding or subtracting the output value of the adaptive filter to or from transmission speech. The processor 450 may transmit the transmission speech, in which an echo is canceled, to a counterpart terminal (e.g., counterpart terminal 330 of FIG. 3).

Figure 10:
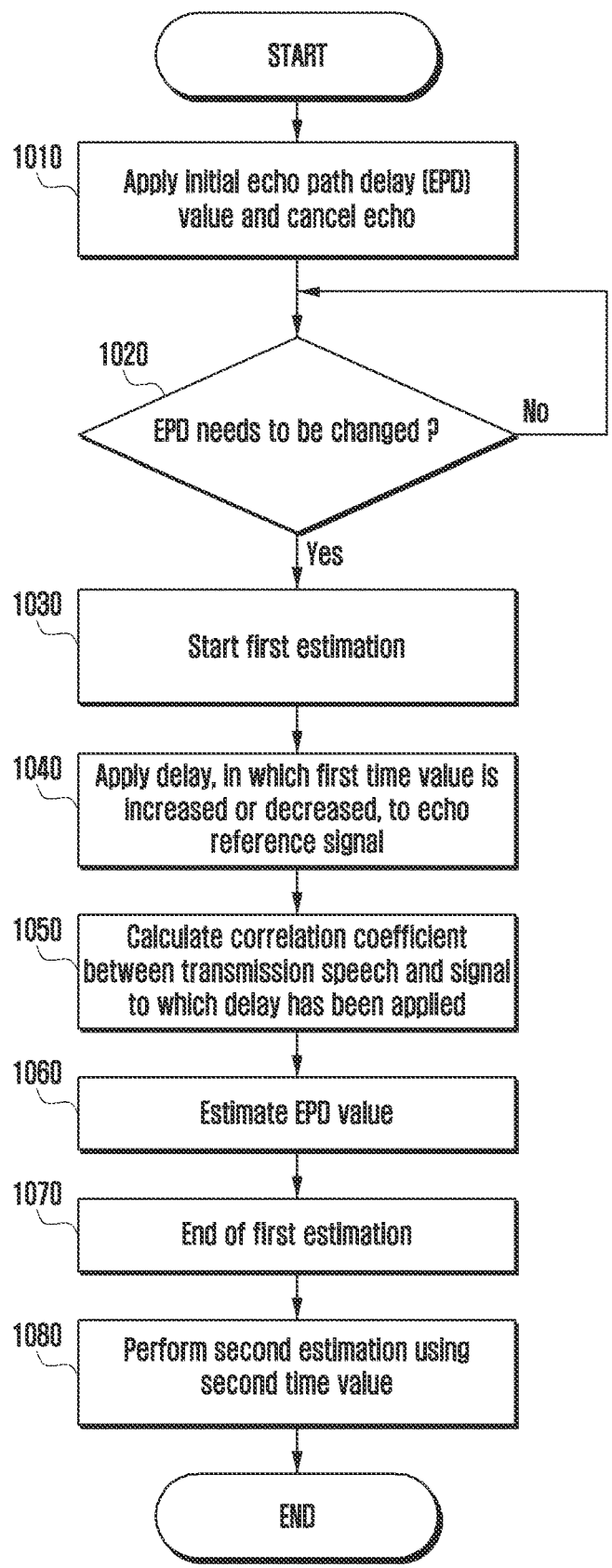
FIG. 10 is a flowchart for an operation of determining an echo path delay (EPD) value by an electronic device according to an embodiment of the disclosure.

FIG. 10 is a flowchart for an operation of determining an echo path delay (EPD) value by an electronic device according to an embodiment of the disclosure.

Referring to FIG. 10, operations in which an electronic device (e.g., electronic device 400 of FIG. 4) determines an echo path delay (EPD) value may be described as respective operations of a processor (e.g., processor 450 of FIG. 4) included in the electronic device 400.

In operation 1010, the processor 450 may cancel an echo by applying an EPD initial value. The initial EPD value may be, for example, an EPD value previously stored in a memory (e.g., memory 440 of FIG. 4). The processor 450 may cancel the echo as in an operation (e.g., operation 940 of FIG. 9) of FIG. 9 by using the initial EPD value. The processor 450 may determine, as the EPD value, an initial EPD value stored in the memory 440. The memory 440 may store a preconfigured EPD value, or may estimate an EPD value when connected to the external electronic device 310. The processor 450 may store the estimated EPD value in the memory 440 and may identify the existing estimated EPD value stored in the memory 440 when connected to the external electronic device 310.

In operation 1020, the processor 450 may determine whether the EPD needs to be changed. The processor 450 may determine whether the EPD value needs to be changed. If an echo reference signal is input beyond a processing range (e.g., length) of an adaptive filter (i.e., if an EPD exceeds the processing range of the adaptive filter), the processor 450 may determine that the EPD needs to be changed. If no echo cancellation is performed by a specific threshold value or greater, for example, if an echo signal is detected to have a magnitude equal to or greater than the specific threshold value, the processor 450 may determine that the EPD needs to be changed.

When the processor 450 determines that the EPD needs to be changed, operation 1030 may be performed. In an embodiment, if the processor 450 does not determine that the EPD needs to be changed, operation 1020 may be performed repeatedly.

According to an embodiment of the disclosure (not shown), if the processor 450 does not determine that the EPD needs to be changed, the initial EPD value may be applied as it is, and the same operation as operation 1010 may be repeated. The processor 450 may be continuously performing operation 1010 while concurrently performing operation 1020. In this case, if the processor 450 determines that the EPD needs to be changed while performing operation 1010, the processor 450 may perform operations 1030 to 1080.

In operation 1030, the processor 450 may start first estimation of the EPD value. The processor 450 may store the echo reference signal in the buffer 411 and may continuously update the adaptive filter by applying the EPD value.

In operation 1040, the processor 450 may apply a delay, in which a first time value is increased or decreased, to the echo reference signal. The processor 450 may continuously update the echo reference signal in the buffer 441 by applying the configured EPD value. The processor 450 may increase or decrease a predetermined time interval from the existing EPD value and may apply the EPD value to the echo reference. A time value to increase or decrease the existing EPD value may be a value greater than the length of the adaptive filter. The time value for an increase or a decrease may be a multiple of the length of the adaptive filter. The processor 450 may, based on comparison of the calculated correlation coefficient values, change the EPD in a direction having a largest correlation coefficient, store the changed EPD as an estimated EPD, and shift the echo reference signal within buffer 441.

In operations 1050 and 1060, the processor 450 may apply, to the echo reference signal, respective time values for increasing and decreasing the existing EPD value by a certain time interval, may calculate respective coefficients of correlations between transmission speech and the echo reference signals, to which the respective time values have been applied, and may estimate the EPD value. If all of the calculated correlation coefficient values are smaller than a threshold value, the processor 450 may change the time value to increase or decrease the EPD. For example, there may be a need to search a wider range from the existing EPD value. If the calculated correlation coefficient values are smaller than a certain range, the processor 450 may repeat the same estimation by applying a time value (e.g., second time value) larger than a first applied time value (e.g., first time value).

In operation 1070 and operation 1080, the processor 450 may estimate (e.g., first estimation) an EPD value (e.g., first EPD estimation value) by using a time value greater than the length of the adaptive filter, and then may perform precise estimation (e.g., second estimation) using a small time value. The second estimation may be performed, for example, by applying a time value (e.g., third time value) smaller than the length of the adaptive filter. The processor 450 may increase or decrease the third time value with respect to the first EPD estimation value acquired in the first estimation, may apply each of an increased value, a non-increased value, and a decreased value to the echo reference signal, and then may calculate a correlation coefficient between transmission speech and each applied signal. The processor 450 may estimate (e.g., second estimation) an EPD by comparing respective correlation coefficients and increasing or decreasing the EPD in a direction having a largest correlation coefficient value. The processor 450 may estimate the EPD value and may identify the estimated EPD value.

An electronic device according to an embodiments of the disclosure may include: a communication module; a sensor module; a sound input module including a microphone; a sound output module including a speaker; a memory including a buffer; and a processor operatively connected to the communication module, the sensor module, the sound input module, the sound output module, and the memory. The processor is configured to be communicatively connected to an external electronic device, determine whether the external electronic device has at least one speaker and/or at least one microphone, select, if the external electronic device has a speaker, a speech reception device, which is to output reception speech, from among the electronic device and the external electronic device on the basis of sensing information received from the sensor module when a call is connected, select, if the external electronic device has a microphone, a speech transmission device, which is to receive transmission speech, from among the electronic device and the external electronic device on the basis of a result of comparing a speech signal received using the sound input module with a speech signal received from the microphone of the external electronic device when a call is connected, and if the speech transmission device and the speech reception device are different devices, enable at least one microphone included in the speech transmission device, disable at least one speaker included in the speech transmission device, disable at least one microphone included in the speech reception device, and enable at least one speaker included in the speech reception device, acquire an echo reference signal related to reception speech received from the speech reception device and store the echo reference signal in the buffer, determine, based on comparison of the stored echo reference signal to transmission speech received from the speech transmission device, an echo path delay (EPD) value relating to an echo signal included in the transmission speech, and cancel the echo signal included in the transmission speech by using the echo reference signal and the determined EPD value.

The sensing information may include location information of a user and location information of the external electronic device, and the processor may be configured to determine signal to noise ratio (SNR) values of speeches to be output from the electronic device and the external electronic device, respectively, on the basis of volume information of the electronic device and external electronic device and the sensing information, and to select the speech reception device on the basis of the determined SNR values.

The selecting of the speech transmission device based on comparison of the speech signal received using the sound input module with the speech signal received from the microphone of the external electronic device may include comparing at least one of SNR values and speech to echo ratio (SER) values of the speech signal received via the sound input module and the speech signal received from the microphone of the external electronic device, respectively.

The processor may be configured to update an adaptive filter, based on the transmission speech and a signal in which the echo reference signal is delayed by the determined EPD value in the transmission speech, and to cancel the echo signal in the transmission speech by using the adaptive filter.

The processor may be configured to receive the echo reference signal from the external electronic device.

The processor may be configured to generate the echo reference signal by using a speech signal received from a call counterpart when the call is connected.

The processor may be configured to apply a preconfigured initial EPD value to the echo cancellation, and if the initial EPD value has a value larger than a length of the adaptive filter, determine an EPD by using first estimation for estimation of an EPD value.

The first estimation may include calculating coefficients of correlations between the transmission speech and a first signal in which the echo reference signal is delayed by the preconfigured initial EPD value, a second signal in which the echo reference signal is delayed by a decrease of the first time value from the initial EPD value, and a third signal in which the echo reference signal is delayed by an increase of the first time value from the initial EPD value, respectively, and estimating the EPD value on the basis of a result of comparing the respective coefficients of correlations.

The first time value may be equal to or greater than the length of the adaptive filter.

The processor may perform second estimation after the first estimation, and the second estimation may be performed using the second time value smaller than the first time value.

The processor may be configured to, when communicatively connected to multiple external electronic devices, determine whether each of the multiple external electronic devices has at least one speaker and/or at least one microphone, select, if at least one of the multiple external electronic devices has a speaker, a speech reception device to output reception speech from among the electronic device and the at least one external electronic device having the speaker on the basis of sensing information received from the sensor module when a call is connected, select, if at least one of the multiple external electronic devices has a microphone, a speech transmission device to receive transmission speech from among the electronic device and the at least one external electronic device having the microphone on the basis of a result of comparing a speech signal received using the sound input module with a speech signal received from the microphone of the at least one external electronic device having the microphone when a call is connected, and if the speech transmission device and the speech reception device are different devices, enable at least one microphone included in the speech transmission device, disable at least one speaker included in the speech transmission device, disable at least one microphone included in the speech reception device and enable at least one speaker included in the speech reception device, transmit, to the speech reception device, a speech signal received from a call counterpart, receive an echo reference signal from the speech reception device, and receive the transmission speech from the speech transmission device.

The processor may be configured to, if the speech reception device does not include a microphone, generate an echo reference signal by using the speech signal received from the call counterpart by the electronic device.

A call connection method of an electronic device according to an embodiment of the disclosure may include: determining whether the external electronic device has at least one speaker and/or at least one microphone, and if the external electronic device has at least one speaker, selecting a speech reception device, which is to output reception speech, from among the electronic device and the external electronic device, based on sensing information when a call is connected; if the external electronic device has at least one microphone, selecting a speech transmission device, which is to receive transmission speech, from among the electronic device and the external electronic device, based on a result of comparing a speech signal received by the electronic device with a speech signal received by the external electronic device when a call is connected; if the speech transmission device and the speech reception device are different devices, enabling at least one microphone included in the speech transmission device, disabling at least one speaker included in the speech transmission device, disabling at least one microphone included in the speech reception device, and enabling at least one speaker included in the speech reception device; acquiring and storing an echo reference signal related to reception speech received from the speech reception device; on the basis of comparison of the stored echo reference signal to transmission speech received from the speech transmission device, determining an echo path delay (EPD) value relating to an echo signal included in the transmission speech; and canceling the echo signal included in the transmission speech by using the echo reference signal and the determined EPD value.

The sensing information may include location information of a user and location information of the external electronic device, and the selecting of the speech reception device includes determining signal to noise ratio (SNR) values of speeches to be output from the electronic device and the external electronic device, respectively, on the basis of volume information of the electronic device and external electronic device and the sensing information, and selecting the speech reception device on the basis of the determined SNR values.

The comparing of the speech signal received using the sound input module with the speech signal received from the microphone of the external electronic device may include comparing at least one of SNR values and speech to echo ratio (SER) values of the speech signal received via the sound input module and the speech signal received from the microphone of the external electronic device, respectively.

The canceling of the echo signal may include updating an adaptive filter, based on the transmission speech and a signal in which the echo reference signal is delayed by the determined EPD value in the transmission speech, and canceling the echo signal in the transmission speech by using the adaptive filter.

The acquiring of the echo reference may include receiving the echo reference signal from the external electronic device.

The acquiring of the echo reference may include generating the echo reference signal by using a speech signal received from a call counterpart when a call is connected.

The determining of the EPD may include: applying a preconfigured initial EPD value to the echo cancellation; and if the initial EPD value has a value larger than a length of the adaptive filter, performing first estimation for estimation of an EPD value.

The first estimation may include calculating coefficients of correlations between the transmission speech and a first signal in which the echo reference signal is delayed by the preconfigured initial EPD value, a second signal in which the echo reference signal is delayed by a decrease of the first time value from the initial EPD value, and a third signal in which the echo reference signal is delayed by an increase of the first time value from the initial EPD value, respectively, and estimating the EPD value on the basis of a result of comparing the respective coefficients of correlations.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used in connection with various embodiments of the disclosure, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

While the disclosure has been shown and described with reference to various embodiments thereof, it will be understood by those skilled in the art that various changes in form and details may be made therein without departing from the spirit and scope of the disclosure as defined by the appended claims and their equivalents.

The invention claimed is:

1. An electronic device comprising:
   a communication circuitry;
   at least one sensor which measures a distance between a user and the electronic device and a distance between an external electronic device and the electronic device;
   at least one microphone;
   at least one speaker;
   memory; and
   a processor operatively connected to the communication circuitry, the at least one sensor, the at least one microphone, the at least one speaker, and the memory,
   wherein the processor is configured to:
      control the communication circuitry to connect to an external electronic device,
      determine whether the external electronic device has at least one speaker and/or at least one microphone when the electronic device performs a call connection to a counterpart terminal,
      if the external electronic device has a speaker, select one from among the electronic device and the external electronic device as a device for outputting reception speech based on sensing information received from the at least one sensor,
      if the external electronic device has a microphone, select one from among the electronic device and the external electronic device as a device for receiving transmission speech based on a result of comparing a speech signal received using the at least one microphone with a speech signal received from the microphone of the external electronic device,
      if the selected device for outputting reception speech is different from the selected device for receiving transmission speech, acquire an echo reference signal related to reception speech received from the selected device for receiving transmission speech and store the echo reference signal in the memory,
      based on a comparison of the stored echo reference signal to transmission speech received from the selected device for outputting reception speech, determine an echo path delay (EPD) value relating to an echo signal included in the transmission speech, and
      cancel the echo signal included in the transmission speech by using the echo reference signal and the determined EPD value.

2. The electronic device of claim 1,
   wherein the sensing information comprises location information of a user and location information of the external electronic device, and
   wherein the processor is further configured to:
      determine signal to noise ratio (SNR) values of speeches to be output from the electronic device and the external electronic device, respectively, based on volume information of the electronic device and external electronic device and the sensing information, and
      select the device for receiving transmission speech based on the determined SNR values.

3. The electronic device of claim 1, wherein the selecting of the selected device which is to output reception speech based on the comparison of the speech signal received using the at least one microphone with the speech signal received from the microphone of the external electronic device comprises comparing at least one of SNR values and speech to echo ratio (SER) values of the speech signal received via the at least one microphone and the speech signal received from the microphone of the external electronic device, respectively.

4. The electronic device of claim 1, wherein the processor is further configured to:
   update an adaptive filter, based on the transmission speech and a signal in which the echo reference signal is delayed by the determined EPD value in the transmission speech; and
   cancel the echo signal in the transmission speech by using the adaptive filter.

5. The electronic device of claim 1, wherein the processor is further configured to receive the echo reference signal from the external electronic device.

6. The electronic device of claim 1, wherein the processor is further configured to generate the echo reference signal by using a speech signal received from a call counterpart when the call is connected.

7. The electronic device of claim 1, wherein the processor is further configured to:
   apply a preconfigured initial EPD value to the echo cancellation, and
   if the initial EPD value has a value larger than a processing range of an adaptive filter, determine an EPD by using first estimation for estimation of an EPD value.

8. The electronic device of claim 7, wherein the first estimation comprises:
   calculating coefficients of correlations between the transmission speech and a first signal in which the echo reference signal is delayed by the preconfigured initial EPD value, a second signal in which the echo reference signal is delayed by a decrease of a first time value from the initial EPD value, and a third signal in which the echo reference signal is delayed by an increase of the first time value from the initial EPD value, respectively, and
   estimating the EPD value based on a result of comparing the respective coefficients of correlations.

9. The electronic device of claim 8, wherein the first time value is equal to or greater than the processing range of the adaptive filter.

10. The electronic device of claim 8,
    wherein the processor is further configured to perform second estimation after the first estimation, and
    wherein the second estimation is performed using a second time value smaller than the first time value.

11. The electronic device of claim 1, wherein the processor is further configured to:
    while communicatively connected to multiple external electronic devices, determine whether each of the multiple external electronic devices has at least one speaker and/or at least one microphone;
    if at least one of the multiple external electronic devices has a speaker, select a speech reception device to output reception speech from among the electronic device and the external electronic device having the speaker based on sensing information received from the at least one sensor when a call is connected;
    if at least one of the multiple external electronic devices has a microphone, select a selected device which is to output reception speech to receive transmission speech from among the electronic device and the external electronic device having the microphone based on a result of comparing a speech signal received using the at least one microphone with a speech signal received from the microphone of the external electronic device having the microphone when a call is connected; and if the selected device and the speech reception device are different devices, enable at least one microphone included in the selected device, disable at least one speaker included in the selected device, disable at least one microphone included in the speech reception device and enable at least one speaker included in the speech reception device;

transmit, to the speech reception device, a speech signal received from a call counterpart;

receive an echo reference signal from the speech reception device; and receive the transmission speech from the selected device.

12. The electronic device of claim 11, wherein the processor is further configured to, if the speech reception device does not have a microphone, generate an echo reference signal by using the speech signal received from the call counterpart by the electronic device.

13. A call connection method of an electronic device communicatively connected to an external electronic device, the call connection method comprising:

controlling communication circuitry to connect to an external electronic device, determining whether the external electronic device has at least one speaker and/or at least one microphone when the electronic device performs a call connection to a counterpart terminal;

if the external electronic device has a speaker, selecting one from among the electronic device and the external electronic devices as a device for outputting reception speech based on sensing information received from at least one sensor;

if the external electronic device has a microphone, selecting a one from among the electronic device and the external electronic devices as a device for receiving transmission speech based on a result of comparing a speech signal received using the at least one microphone with a speech signal received from the microphone of the external electronic device;

if the selected device for outputting reception speech is different from the selected device for receiving transmission speech, acquiring an echo reference signal related to reception speech received from the selected device for receiving transmission speech and store the echo reference signal in memory;

based on a comparison of the stored echo reference signal to transmission speech received from the selected device for outputting reception speech, determining an echo path delay (EPD) value relating to an echo signal included in the transmission speech; and cancelling the echo signal included in the transmission speech by using the echo reference signal and the determined EPD value.

14. The method of claim 13, wherein the sensing information comprises location information of a user and location information of the external electronic device, and wherein the selecting of the selected device for receiving transmission speech comprises:

determining signal to noise ratio (SNR) values of speech to be output from the electronic device and the external electronic device, respectively, based on volume information of the electronic device and external electronic device and the sensing information, and selecting the selected device on a basis of the determined SNR values.

15. The method of claim 13, wherein the comparing of the speech signal received using a sound input module with the speech signal received from the microphone of the external electronic device comprises:

comparing at least one of SNR values and speech to echo ratio (SER) values of the speech signal received via the sound input module and the speech signal received from the microphone of the external electronic device, respectively.

16. The method of claim 13, wherein the canceling of the echo signal comprises:

updating an adaptive filter, based on the transmission speech and a signal in which the echo reference signal is delayed by the determined EPD value in the transmission speech; and canceling the echo signal in the transmission speech by using the adaptive filter.

17. The method of claim 13, wherein the acquiring of the echo reference signal comprises:

receiving the echo reference signal from the external electronic device.

18. The method of claim 13, wherein the acquiring of the echo reference signal comprises:

generating the echo reference signal by using a speech signal received from a call counterpart when a call is connected.

* * * * *